(12) United States Patent
Tanaka et al.

(10) Patent No.: US 11,327,020 B2
(45) Date of Patent: May 10, 2022

(54) IMAGING SYSTEM, IMAGING METHOD, AND PROGRAM

(71) Applicants: FUJIFILM Corporation, Tokyo (JP); CYTIVA SWEDEN AB, Uppsala (SE)

(72) Inventors: Yasutake Tanaka, Ashigarakami-gun (JP); Akira Yamaguchi, Ashigarakami-gun (JP); Erik Bjerneld, Uppsala (SE)

(73) Assignees: FUJIFILM Corporation, Tokyo (JP); CYTIVA SWEDEN AB, Uppsala (SE)

( * ) Notice: Subject to any disclaimer, the term of this patent is extended or adjusted under 35 U.S.C. 154(b) by 6 days.

(21) Appl. No.: 17/072,760

(22) Filed: Oct. 16, 2020

(65) Prior Publication Data

US 2021/0033537 A1 Feb. 4, 2021

Related U.S. Application Data

(63) Continuation of application No. PCT/JP2019/016176, filed on Apr. 15, 2019.

(30) Foreign Application Priority Data

Apr. 17, 2018 (JP) .............................. JP2018-079361

(51) Int. Cl.
*G01N 21/64* (2006.01)
*H04N 5/232* (2006.01)
(Continued)

(52) U.S. Cl.
CPC ..... *G01N 21/6486* (2013.01); *G01N 21/6447* (2013.01); *G01N 21/6458* (2013.01);
(Continued)

(58) Field of Classification Search
CPC ........... G01N 21/6486; G01N 21/6447; G01N 21/6458; G01N 21/76; G01N 21/78;
(Continued)

(56) References Cited

U.S. PATENT DOCUMENTS 6,529,768 B1 3/2003 Hakamata
2010/0231757 A1 9/2010 Sambongi
(Continued)

FOREIGN PATENT DOCUMENTS

CN 106303279 A * 1/2017
EP 2988490 A1 2/2016
(Continued)

OTHER PUBLICATIONS

International Preliminary Report on Patentability and Written Opinion of the International Searching Authority (Forms PCT/IB/326, PCT/IB/373, and PCT/ISA/237) for International Application No. POT/JP2019/016176, dated Oct. 29, 2020, with an English translation.

(Continued)

*Primary Examiner* — Kiho Kim
(74) *Attorney, Agent, or Firm* — Birch, Stewart, Kolasch & Birch, LLP

(57) ABSTRACT

An imaging system includes: an imaging unit that images a subject; and a control unit that enables the imaging unit to perform pre-imaging one or more times, and main imaging one or more times following the pre-imaging; the control unit has an image generating portion that generates a subject image based on one or more taken images in each of the pre-imaging and the main imaging, an interface portion that displays the subject image and accepts a user input for setting at least a region-of-interest, of the region-of-interest and a non-region-of-interest of the subject image, a region setting portion as defined herein, an SN ratio calculating portion as defined herein, and a total light exposure time calculating portion as defined herein; and the control unit enables the imaging unit to perform the main imaging based on the total light exposure time.

32 Claims, 17 Drawing Sheets

(51) Int. Cl.
*H04N 5/235* (2006.01)
*H04N 5/321* (2006.01)

(52) U.S. Cl.
CPC ..... *H04N 5/2353* (2013.01); *H04N 5/232127* (2018.08); *H04N 5/321* (2013.01)

(58) Field of Classification Search
CPC .......... H04N 5/232127; H04N 5/2353; H04N 5/321; H04N 5/2351; H04N 5/2173; H04N 5/23216; H04N 5/232933; H04N 5/232945; H04N 5/353; G03B 7/091
See application file for complete search history.

(56) References Cited

U.S. PATENT DOCUMENTS

| | | |
|---|---|---|
| 2011/0228143 A1 | 9/2011 | Makino |
| 2013/0314520 A1 | 11/2013 | Ishihara |
| 2015/0172526 A1 | 6/2015 | Swihart et al. |
| 2015/0207973 A1 | 7/2015 | Iwasaki |
| 2016/0057329 A1 | 2/2016 | Tanaka et al. |
| 2016/0255263 A1 | 9/2016 | Tanaka et al. |
| 2016/0269660 A1 | 9/2016 | Tanaka et al. |

FOREIGN PATENT DOCUMENTS

| | | | |
|---|---|---|---|
| EP | 3062147 A1 | 8/2016 | |
| EP | 3067688 A1 | 9/2016 | |
| JP | 2000-157518 A | 6/2000 | |
| JP | 2001-137175 A | 5/2001 | |
| JP | 2004-24497 A | 1/2004 | |
| JP | 2010-200177 A | 9/2010 | |
| JP | 2010-216982 A | 9/2010 | |
| JP | 2011-199659 A | 10/2011 | |
| JP | JR 2015-136087 A | 7/2015 | |
| JP | JR 2016-161653 A | 9/2016 | |
| JP | JR 2016-171415 A | 9/2016 | |
| JP | 2017-130856 A | 7/2017 | |
| WO | WO 2012/114934 A1 | 8/2012 | |
| WO | WO-2012114934 A1 * | 8/2012 | ......... A61B 1/00009 |
| WO | WO-2013035738 A1 * | 3/2013 | ......... G01N 21/6456 |
| WO | WO 2016/127107 A2 | 8/2016 | |

OTHER PUBLICATIONS

International Search Report (Form PCT/ISA/210) for International Application No. PCT/JP2019/016176, dated Jun. 25, 2019, with an English translation.
Partial Supplementary European Search Report for corresponding European Application No. 19788972.8, dated May 4, 2021.
Extended European Search Report for corresponding European Application No. 19788972.8, dated Sep. 2, 2021.
Office Action dated Dec. 14, 2021 in corresponding Japanese Patent Application No. 2020-514377, with English translation.

* cited by examiner

IMAGING SYSTEM, IMAGING METHOD, AND PROGRAM

CROSS REFERENCE TO RELATED APPLICATION

This is a continuation of International Application No. PCT/JP2019/016176 filed on Apr. 15, 2019, and claims priority from Japanese Patent Application No. 2018-079361 filed on Apr. 17, 2018, the entire disclosures of which are incorporated herein by reference.

TECHNICAL FIELD

The present invention relates to an imaging system, an imaging method, and a program.

BACKGROUND ART

For example, in the field of biochemistry, there are known imaging apparatuses by each of which a sample that emits light as a result of a chemical reaction is imaged as a subject, a sample that is labeled with a fluorescent substance and that is irradiated with excitation light so as to emit light is imaged as a subject, or a sample that is dyed by a CBB (Coomassie Brilliant Blue) pigment or the like and that is irradiated with transmitted light so as to develop a color is imaged as a subject.

An imaging apparatus described in Patent Document 1 obtains a histogram of pixel values in an image of a subject taken by pre-imaging, sets, as a background portion, a maximum peak of peaks appearing in the histogram, and sets, as a detection target, a minimum peak of the peaks. The imaging apparatus refers to table data representing a correspondence relation among a pixel value, a cooling temperature, an exposure time, and a ratio, and determines a light exposure time in which a reference ratio or more can be obtained, based on a ratio which is a ratio between the pixel value of the detection target and the pixel value of the background portion, which have been set in the image taken by pre-imaging. Then, the imaging apparatus performs main imaging in the determined light exposure time.

An imaging apparatus described in Patent Document 2 uses a nondestructive readable device to repeat short-time light exposure until light emission of a subject fades to a level as low as readout noise of the device.

PATENT DOCUMENTS

Patent Document 1: JP-A-2011-199659
Patent Document 2: U.S. Unexamined Patent Application Publication No. 2015/0172526

SUMMARY OF INVENTION

In the imaging apparatus described in Patent Document 1, the minimum peak appearing in the histogram of the pixel values in the image taken by the pre-imaging is automatically set as the detection target. According to imaging conditions of the pre-imaging, a peak not appearing in the histogram of the image taken by the pre-imaging may be included in the subject. In this case, the peak not appearing in the histogram cannot be imaged with a desired Signal to Noise (SN) ratio in the main imaging. In addition, in the imaging apparatus described in Patent Document 1, the light exposure time is determined as a light exposure time in which the reference SN ratio or more can be obtained. However, the SN ratio in the subject whose light emission fades may not reach the reference SN ratio.

In the imaging apparatus described in Patent Document 2, the light exposure is repeated until the light emission of the subject fades to the level as low as the readout noise of the device. Accordingly, there is a fear that a subject whose light emission fades comparatively slowly, particularly, a subject that emits fluorescence may be exposed to light for a long time, causing waste of time.

An object of the present invention is to image a subject whose light emission or color development distribution is unknown, with a high SN ratio and in a suitable light exposure time.

According to an aspect of the present invention, there is provided an imaging system including: an imaging unit that images a subject; and a control unit that enables the imaging unit to perform pre-imaging one or more times, and main imaging one or more times following the pre-imaging; wherein: the control unit has an image generating portion that generates a subject image based on one or more taken images in each of the pre-imaging and the main imaging, an interface portion that displays the subject image and accepts a user input for setting at least a region-of-interest, of the region-of-interest and a non-region-of-interest of the subject image, a region setting portion that sets the region-of-interest based on the user input, and sets the non-region-of-interest, an SN ratio calculating portion that calculates an SN ratio which is a ratio of a signal component of a pixel value to a noise component of the pixel value based on the set region-of-interest and the set non-region-of-interest, and a total light exposure time calculating portion that calculates a total light exposure time in which a maximum SN ratio or a preset reference SN ratio can be obtained, based on the SN ratio calculated for the one or more taken images; and the control unit enables the imaging unit to perform the main imaging based on the total light exposure time.

According to another aspect of the present invention, there is provided an imaging system including: an imaging unit that images a subject; and a control unit that enables the imaging unit to perform pre-imaging one or more times, and main imaging one or more times following the pre-imaging; wherein: the control unit has an image generating portion that generates a subject image based on one or more taken images in each of the pre-imaging and the main imaging, an interface portion that displays the subject image, a region setting portion that sets a region-of-interest and a non-region-of-interest of the subject image, an SN ratio calculating portion that calculates an SN ratio which is a ratio of a signal component of a pixel value to a noise component of the pixel value based on the set region-of-interest and the set non-region-of-interest, and a total light exposure time calculating portion that calculates a total light exposure time in which a maximum SN ratio or a preset reference SN ratio can be obtained, based on the SN ratio calculated for the one or more taken images; and the control unit enables the imaging unit to perform the main imaging based on the total light exposure time.

According to an aspect of the present invention, there is provided an imaging method including the steps of: performing pre-imaging one or more times by use of an imaging unit imaging a subject; generating a subject image based on one or more images taken by the pre-imaging; displaying the generated subject image, setting a region-of-interest of the subject image based on a user input, and setting a non-region-of-interest of the subject image; calculating an SN ratio which is a ratio of a signal component of a pixel value to a noise component of the pixel value based on the set region-of-interest and the set non-region-of-interest; calculating a total light exposure time in which a maximum SN ratio or a preset reference SN ration can be obtained, based on the SN ratio calculated for the one or more taken images; performing main imaging one or more times based on the calculated total light exposure time by use of the imaging unit; and generating a subject image based on one or more images taken by the main imaging.

According to another aspect of the present invention, there is provided an imaging method including the steps of: performing pre-imaging one or more times by use of an imaging unit imaging a subject; generating a subject image based on one or more images taken by the pre-imaging; setting a region-of-interest and a non-region-of-interest of the subject image; calculating an SN ratio which is a ratio of a signal component of a pixel value to a noise component of the pixel value based on the set region-of-interest and the set non-region-of-interest; calculating a total light exposure time in which a maximum SN ratio or a preset reference SN ration can be obtained, based on the SN ratio calculated for the one or more taken images; performing main imaging one or more times based on the total light exposure time by use of the imaging unit; and generating a subject image based on one or more images taken by the main imaging.

According to an aspect of the present invention, there is provided a program causing a computer to execute each of the steps of the aforementioned imaging method.

According to the present invention, a subject whose light emission or color development distribution is unknown can be imaged with a high SN ratio and in a suitable light exposure time.

EMBODIMENTS FOR CARRYING OUT THE INVENTION

Figure 1:
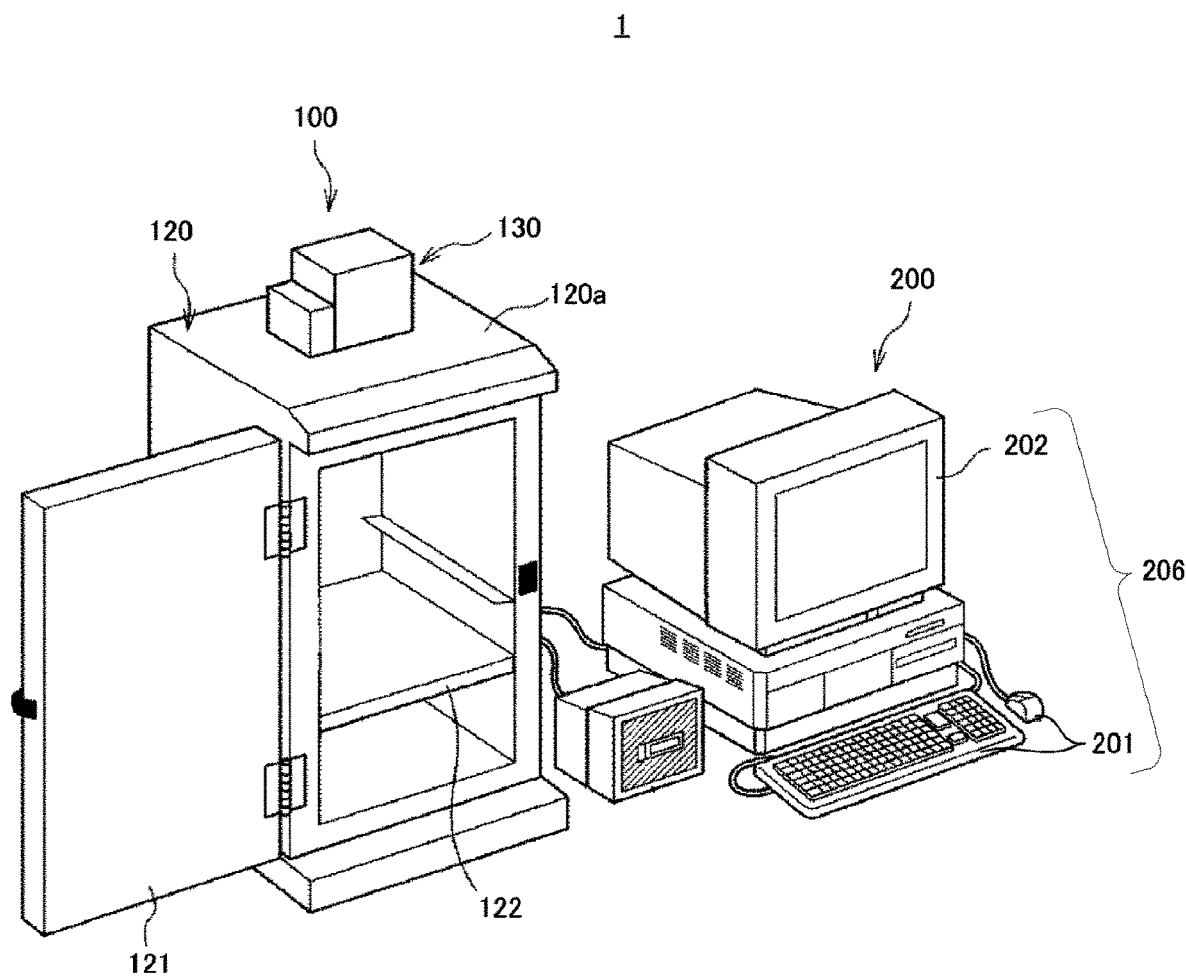
FIG. 1 is a perspective view of an example of an imaging system for explaining an embodiment of the present invention.

FIG. 1 shows an example of an imaging system for explaining an embodiment of the present invention.

The imaging system 1 is an imaging system which images a subject according to the subject, i.e. images the subject with excitation light radiated thereon or images the subject without the excitation light radiated thereon, to thereby acquire a photographic image of the subject. The subject may be a sample which emits light as a result of a chemical reaction (hereinafter referred to as chemiluminescent sample) or may be a sample which is labeled with a fluorescent substance and irradiated with the excitation light to thereby emit light (hereinafter referred to as fluorescent sample). In addition, the subject may be a sample which is dyed by a CBB (Coomassie Brilliant Blue) pigment or the like and irradiated with transmitted light to thereby develop a color (hereinafter referred to as transparent colorimetric sample). The imaging system 1 includes an imaging apparatus 100 which is an imaging unit, and a control apparatus 200 which is a control unit enabling the imaging apparatus 100 to perform imaging.

Figure 2:
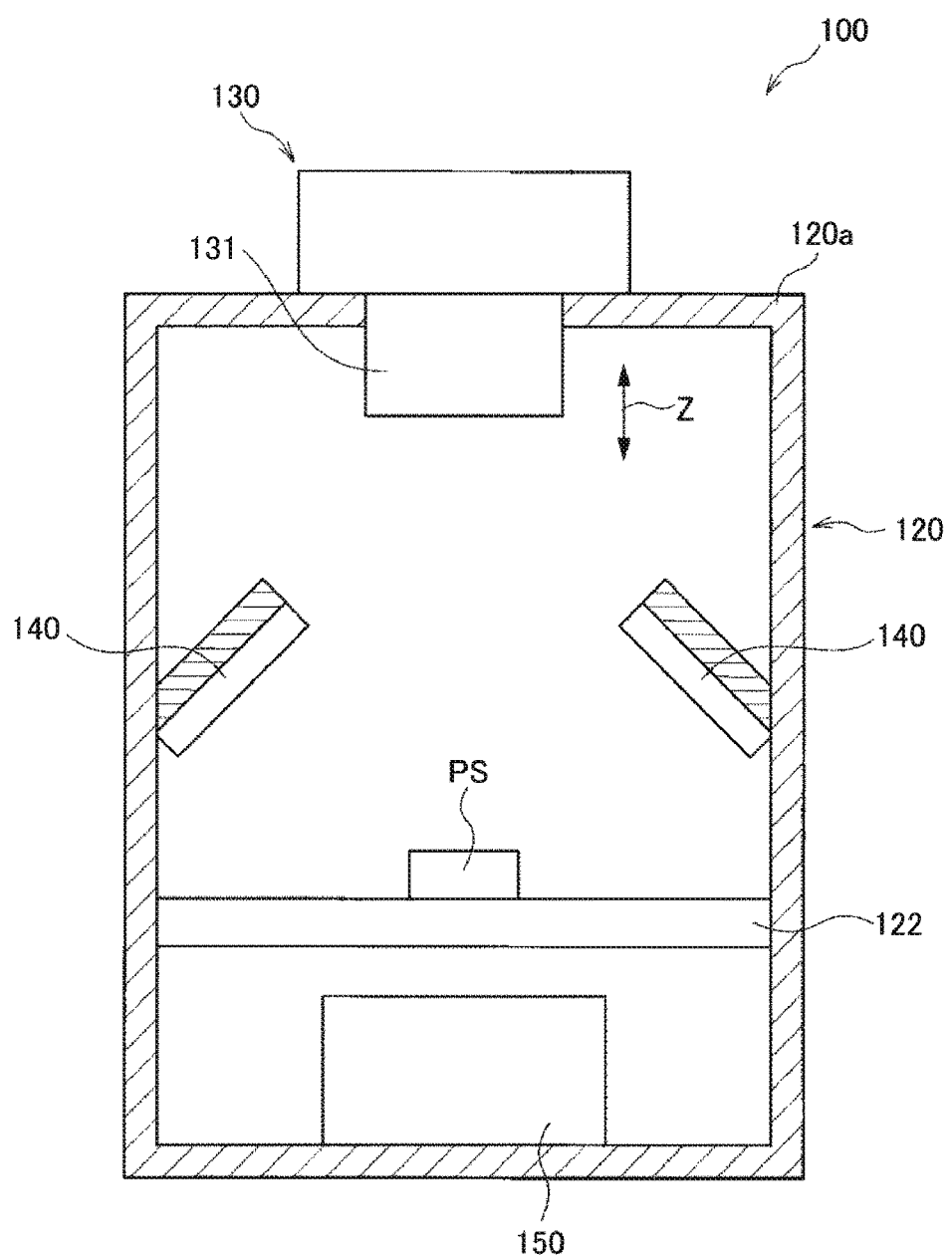
FIG. 2 is a sectional view of an imaging unit of the imaging system in FIG. 1.

FIG. 2 shows the configuration of the imaging apparatus 100.

The imaging apparatus 100 includes a housing 120, an imaging portion 130, incident light sources 140, and a transmitted light source 150.

The housing 120 receives a subject PS. The housing 120 is a box substantially shaped like a rectangular parallelepiped. The housing 120 has a lid 121 (see FIG. 1) which can be opened and closed. The lid 121 is opened/closed by a user. The subject PS is received inside the housing 120 through an opening closed by the lid 121. In a state in which the lid 121 is closed, external light is shielded so that the inside of the housing 120 becomes a dark room. A subject placement portion 122 is provided inside the housing 120. The subject PS is placed on the subject placement portion 122.

The imaging portion 130 images the subject PS. The imaging portion 130 is set on an upper face 120a of the housing 120. The imaging portion 130 is placed above the subject PS placed on the subject placement portion 122, and placed face to face with the subject PS. The imaging portion 130 has a lens portion 131 movable in an up/down direction (Z-direction). By the vertical movement of the lens portion 131, the focus during imaging can be put on the subject PS.

The incident light sources 140 emit excitation light from diagonally above the subject PS toward the subject PS placed on the subject placement portion 122. The transmitted light source 150 radiates transmitted light from below the subject PS toward the subject PS placed on the subject placement portion 122. When the subject PS is a fluorescent sample, the excitation light is radiated from the incident light sources 140. In addition, when the subject PS is a transparent colorimetric sample, the transmitted light is radiated from the transmitted light source 150.

Figure 3:
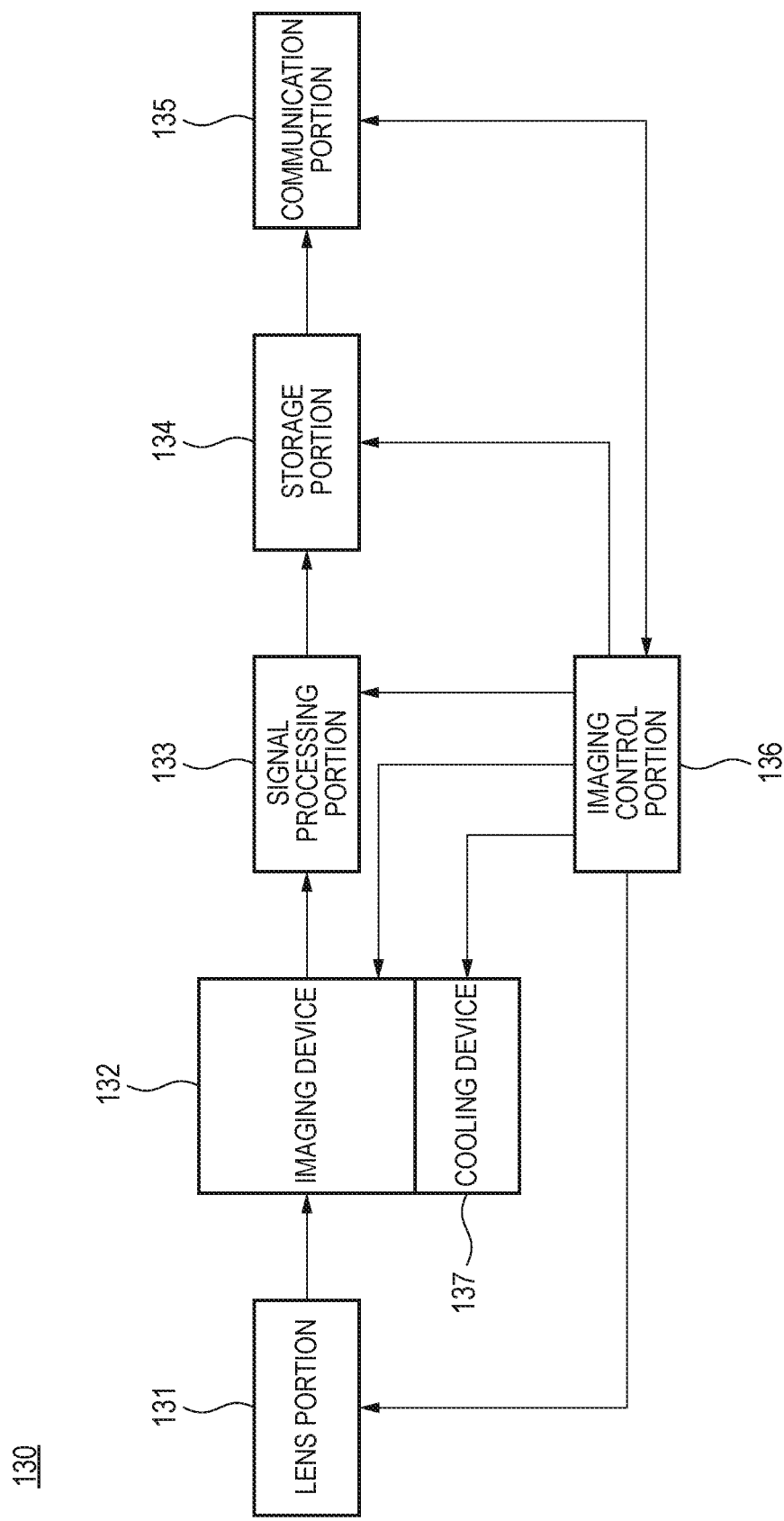
FIG. 3 is a functional block diagram of an imaging portion of the imaging unit in FIG. 2.

FIG. 3 shows the configuration of the imaging portion 130.

The imaging portion 130 includes the lens portion 131, an imaging device 132, a signal processing portion 133, a storage portion 134, a communication portion 135, and an imaging control portion 136 that generally controls operations of the lens portion 131, the imaging device 132, the signal processing portion 133, the storage portion 134 and the communication portion 135.

The communication portion 135 is connected to the control apparatus 200 through a wired or wireless network. An instruction transmitted from the control apparatus 200 to the imaging portion 130 is inputted to the imaging control portion 136 through the communication portion 135. The imaging control portion 136 activates the respective portions such as the lens portion 131 based on the inputted instruction so as to perform imaging.

Although not shown, the lens portion 131 is, for example, configured to include a lens group made up of a plurality of optical lenses, a diaphragm adjusting mechanism, an automatic focus adjusting mechanism, etc. The lens group is provided movably in the Z-direction shown in FIG. 2. The automatic focus adjusting mechanism moves the lens group in accordance with a distance between the subject PS and the imaging portion 130 so as to put the focus during imaging on the subject PS. The diaphragm adjusting mechanism changes an aperture diameter of a diaphragm so as to adjust a light quantity passing through the lens portion 131. Light emitted from the subject PS forms an image on an imaging face of the imaging device 132 through the lens portion 131. Incidentally, the lens portion 131 may include a zoom mechanism.

The imaging device 132 photoelectrically converts the subject image formed on the imaging face into signal charges. The imaging device 132 is, for example, an image sensor such as a charge coupled device (CCD) or a metal oxide semiconductor (MOS). The imaging device 132 converts the signal charges into an analog voltage signal through a not-shown charge-voltage conversion amplifier, and outputs the converted analog voltage signal.

The signal processing portion 133 applies various signal processings to the analog voltage signal outputted from the imaging device 132. One of the signal processings is, for example, correlated double sampling processing. The correlated double sampling processing takes a difference between a feedthrough component level and an image signal component level included in an output signal for each pixel of the imaging device 132, so as to reduce noise or the like included in the output signal for each pixel. The signal processing portion 133 converts an analog signal subjected to the signal processings such as the correlated double sampling processing into a digital signal, and outputs the converted digital signal.

The storage portion 134 stores the digital signal outputted from the signal processing portion 133 as photographic image data. The photographic image data stored in the storage portion 134 are transmitted from the communication portion 135 to the control apparatus 200.

In the present example, the imaging portion 130 further includes a cooling device 137 for cooling the imaging device 132. The cooling device 137 is a temperature-controllable device such as a Peltier device. The temperature of the cooling device 137 is controlled by the imaging control portion 136. Dark current noise is a part of a noise component included in the output signal of the imaging device 132. The dark current noise is generated due to electric charges accumulated in each pixel even in a state in which light is not incident on the imaging device 132. In addition, readout noise is another part of the noise component included in the output signal of the imaging device 132. The readout noise is generated due to thermal noise etc. of the charge-voltage conversion amplifier which converts the signal charges into the analog voltage signal. Both the dark current noise and the readout noise have temperature dependence. In the present example, the imaging device 132 is properly cooled by the cooling device 137 so that the dark current noise and the readout noise can be reduced.

Figure 4:
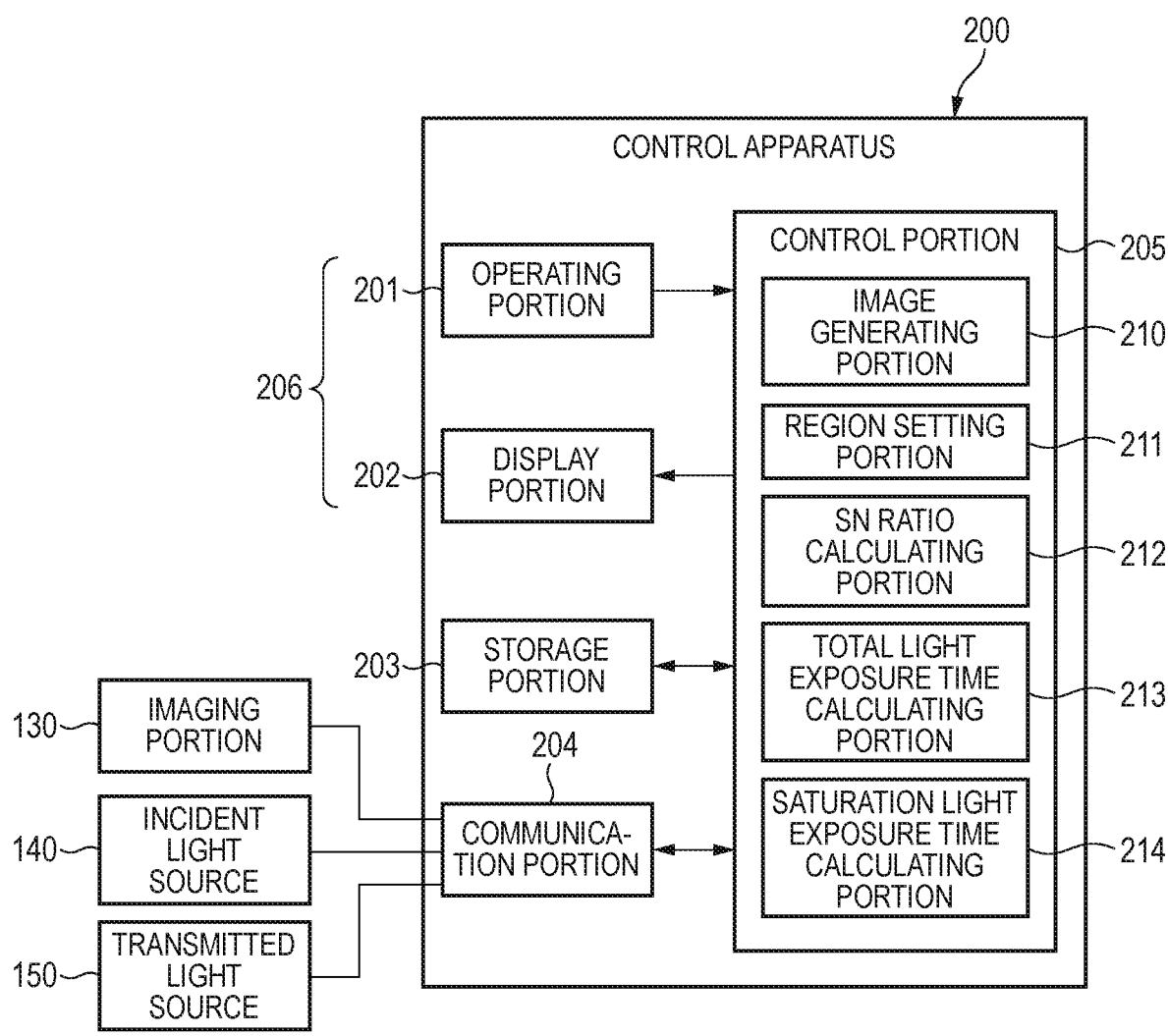
FIG. 4 is a functional block diagram of a control unit of the imaging system in FIG. 1.

FIG. 4 shows the configuration of the control apparatus 200.

The control apparatus 200 includes an operating portion 201, a display portion 202, a storage portion 203, a communication portion 204, and a control portion 205 generally controlling operations of the operating portion 201, the display portion 202, the storage portion 203, the communication portion 204 and the imaging apparatus 100.

For example, the operating portion 201 accepts a user input for setting imaging conditions. For example, the display portion 202 displays an interface image used for the user input for setting the image conditions. In addition, the display portion 202 displays a subject image generated based on an image (hereinafter referred to as photographic image) taken by the imaging apparatus 100. The operating portion 201 is, for example, constituted by a keyboard, a mouse, etc. The display portion 202 is, for example, constituted by a liquid crystal display (LCD) etc. An interface portion 206 is constituted by the operating portion 201 and the display portion 202.

The storage portion 203 stores a control program and control data executed by the control portion 205, and stores image data of the photographic image and image data of the subject image. The storage portion 203 is, for example, constituted by a storage medium such as a flash memory, a hard disk, an ROM (Read Only Memory) or an RAM (Random Access Memory).

The communication portion 204 is connected to the imaging portion 130, the incident light sources 140, and the transmitted light source 150 of the imaging apparatus 100 through the wired or wireless network. An instruction complying with the set imaging conditions is transmitted from the communication portion 204 to the imaging portion 130, the incident light sources 140, and the transmitted light source 150. Further, the photographic image data transmitted from the imaging portion 130 are received by the communication portion 204.

The control portion 205 operates in accordance with the control program stored in the storage portion 203 so as to generally control the operations of the operating portion 201, the display portion 202, the storage portion 203, the communication portion 204 and the imaging apparatus 100. In addition, the control portion 205 operates in accordance with the control program so as to also function as an image generating portion 210 for generating the subject image based on the photographic image, and also function as a region setting portion 211, an SN ratio calculating portion 212, a total light exposure time calculating portion 213, and a saturation light exposure time calculating portion 214. The functions of the respective processing portions of the image generating portion 210, the region setting portion 211, the SN ratio calculating portion 212, the total light exposure time calculating portion 213 and the saturation light exposure time calculating portion 214 will be described later.

The hardware structure of the control portion 205 performing various processings as the image generating portion 210, the region setting portion 211, the SN ratio calculating portion 212, the total light exposure time calculating portion 213 and the saturation light exposure time calculating portion 214 includes a CPU (Central Processing Unit) which is a general purpose processor, a programmable logic device (PLD) which is a processor capable of changing its circuit configuration after production such as an FPGA (Field Programmable Gate Array), a dedicated electric circuit which is a processor having a circuit configuration specially designed for executing specific processing such as an ASIC (Application Specific Integrated Circuit), etc.

Each of the processing portions of the image generating portion 210, the region setting portion 211, the SN ratio calculating portion 212, the total light exposure time calculating portion 213 and the saturation light exposure time calculating portion 214 may be constituted by one processor of the aforementioned various processors, or may be constituted by a combination of two or more processors the same or different in type (e.g. a combination of the FPGAs or a combination of the CPU and the FPGA). In addition, the processing portions may be constituted by one processor.

Figure 5:
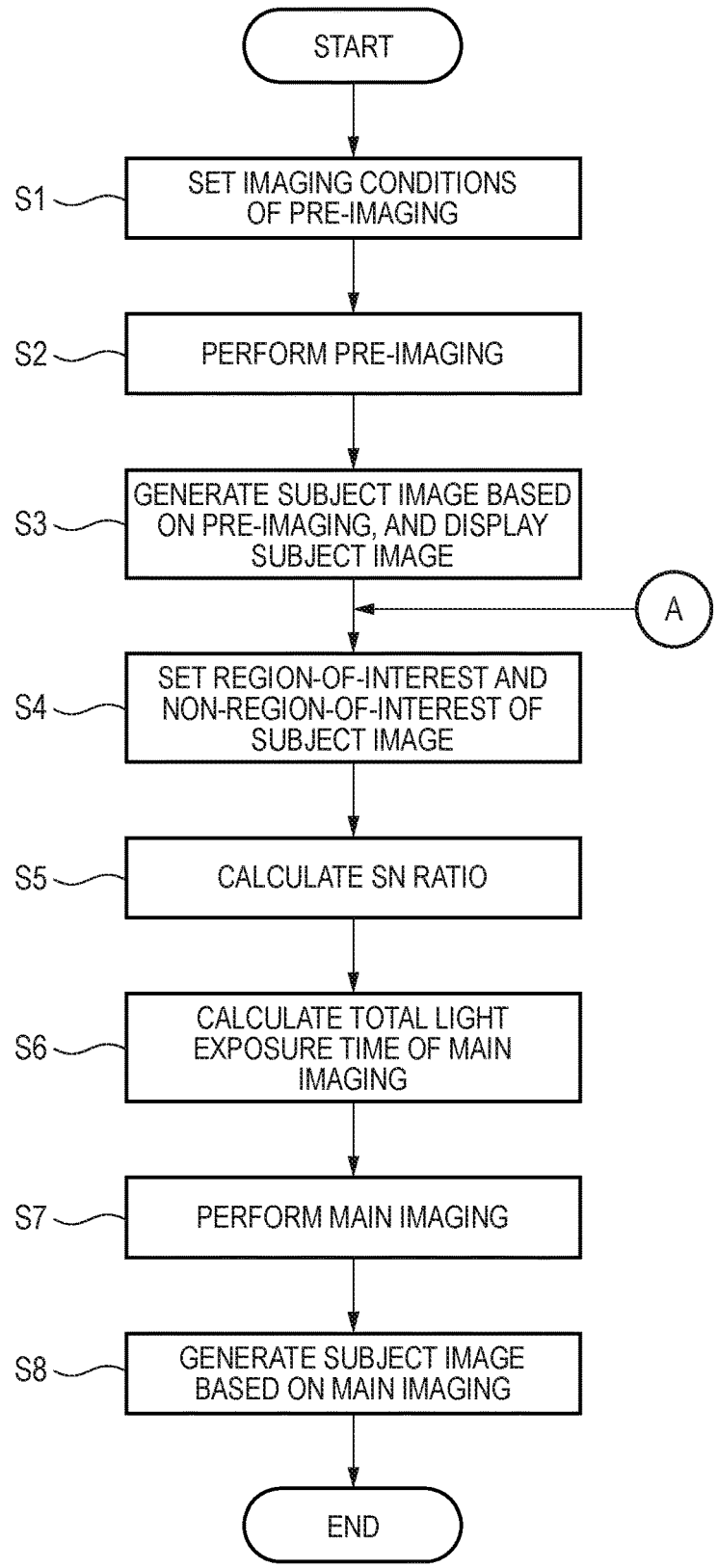
FIG. 5 is a flow chart of an imaging process executed by the control unit in FIG. 4.

FIG. 5 shows the outline of the imaging process executed by the control apparatus 200.

The control apparatus 200 enables the imaging apparatus 100 to perform pre-imaging one or more times and main imaging one or more times following the pre-imaging. Here, the main imaging means imaging performed for obtaining a subject image for analysis, and the pre-imaging means imaging performed for obtaining information for setting imaging conditions of the main imaging such as an exposure time.

The control apparatus 200 sets imaging conditions of pre-imaging (step S1), enables the imaging apparatus 100 to perform the pre-imaging based on the set imaging conditions (step S2), and generates a subject image based on a photographic image or images taken by the pre-imaging to display the generated subject image on the display portion 202 (step S3).

Next, the control apparatus 200 sets a region-of-interest and a non-region-of-interest of the generated subject image (step S4), calculates an SN ratio (Signal-Noise ratio) which is a ratio of a signal component of a pixel value to a noise component of the pixel value based on the set region-of-interest and the set non-region-of-interest (step S5), and calculates a total light exposure time of the main imaging in which a preset reference SN ratio can be obtained, based on the SN ratio calculated for the one or more taken images (step S6).

The control apparatus 200 enables the imaging apparatus 100 to perform the main imaging based on the calculated total light exposure time (step S7), and generates a subject image based on a photographic image or images taken by the main imaging (step S8).

The steps of the aforementioned imaging process, and the functions carried out by the processing portions (the image generating portion 210, the region setting portion 211, the SN ratio calculating portion 212, the total light exposure time calculating portion 213, and the saturation light exposure time calculating portion 214) of the control portion 205 in the steps will be described below.

Setting of Imaging Conditions of Pre-Imaging (Step S1)

The imaging conditions of the pre-imaging are set based on a user input. Preferably, a subject kind is set based on the user input, and detailed imaging conditions are automatically set by the control portion 205 in accordance with the set subject kind. For example, assume that a chemiluminescent sample, a fluorescent sample, and a transparent colorimetric sample are available as the subject kind. In this case, the subject kind is set as the chemiluminescent sample, the fluorescent sample or the transparent colorimetric sample based on the user input. Detailed imaging conditions for each subject kind are stored in advance in the storage portion 203. The control portion 205 reads out the imaging conditions corresponding to the set subject kind from the storage portion 203, and sets the read-out imaging conditions as the imaging conditions of the pre-imaging.

The imaging conditions for each subject kind are whether to radiate excitation light or not, whether to radiate transmitted light or not, a light exposure time, etc. A light exposure time suited for a subject exhibiting light emission or color development with standard intensity is used as the light exposure time. Incidentally, from the viewpoint of shortening the time required for the pre-imaging, binning may be applied to the imaging device 132. The binning is to add up signal charges from a plurality of pixels in the imaging device 132 to thereby generate a pixel value of one pixel in a photographic image. Due to the Binning, sensitivity of the imaging device 132 can be enhanced so that the light exposure time can be shortened. In addition, the pre-imaging may be performed multiple times on a subject whose color development or light emission intensity is unknown while the light exposure time is made different from one pre-imaging to another.

Pre-Imaging (Step S2) and Generation and Display of Subject Image (Step S3)

Figure 6:
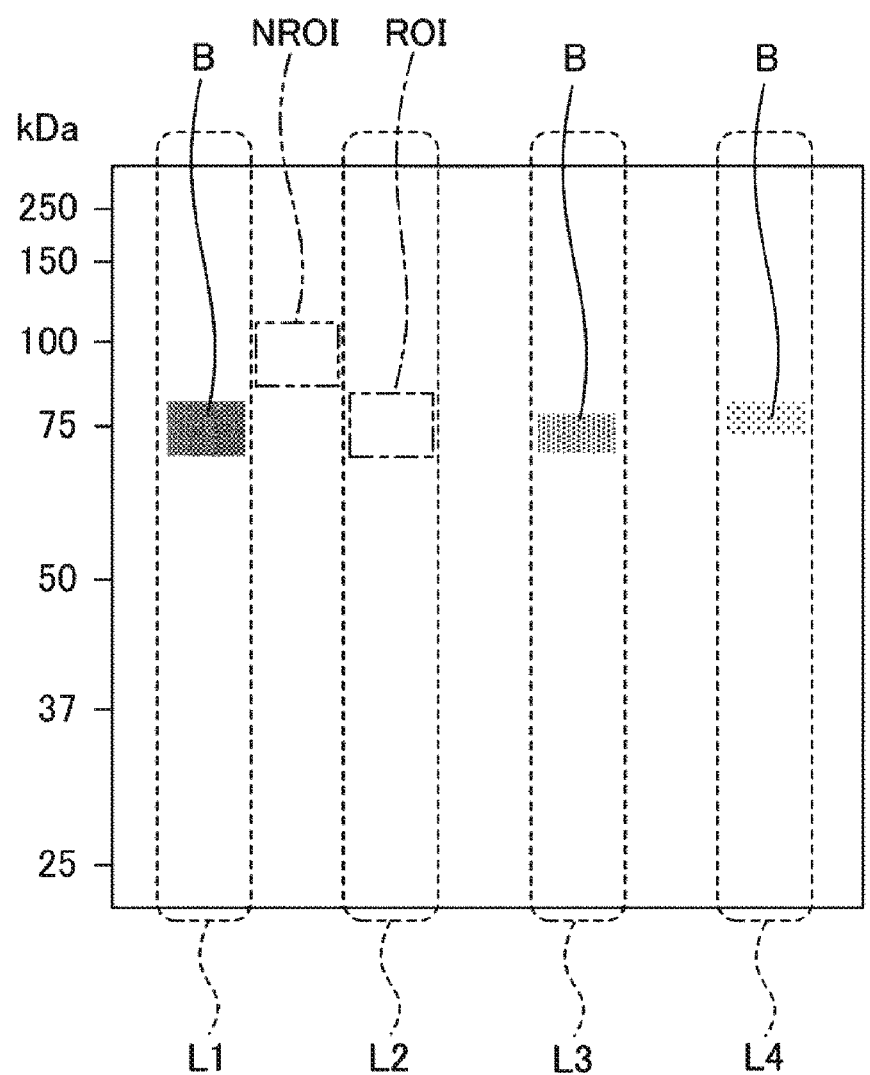
FIG. 6 is a schematic view of an example of a subject image obtained by pre-imaging.

FIG. 6 shows an example of the subject image generated by the pre-imaging.

In the example shown in FIG. 6, light emission patterns of chemiluminescent samples or fluorescent samples obtained by a western blotting method are formed into an image. The western blotting method is a technique for separating the samples according to their molecular weights by electrophoresis, making a labeled antibody specifically binding to a detection target react to each sample, and detecting fluorescence or chemiluminescence used for the labeling, thereby detecting the detection target. In FIG. 6, the light emission patterns of lanes 1 to 4 show the light emission patterns of the samples different from one lane to another. The detection targets included in the samples of the lanes can be detected and quantitatively determined based on the light emission patterns of the lanes and intensities of the light emissions.

The image generating portion 210 generates a subject image based on the photographic image or images taken by the pre-imaging. When the pre-imaging is performed only once, the photographic image taken by the one time of the pre-imaging is set as the subject image. When the pre-imaging is performed multiple times while the light exposure time is made different from one imaging to another, for example, a photograph image whose dynamic range is widest among the photographic images taken by the multiple times of the pre-imaging can be set as the subject image, and the dynamic range can be obtained from a histogram of pixel values in the photographic image. In addition, the photographic images may be added up or averaged by arithmetic or weighted averaging as the subject image. The subject image generated by the pre-imaging is displayed on the display portion 202.

Setting of Region-of-Interest and Non-Region-of-Interest (Step S4)

A region-of-interest ROI and a non-region-of-interest NROI of the subject image generated by the pre-imaging are set by the region setting portion 211. The region-of-interest ROI is, for example, set based on a user input. The subject image obtained by the pre-imaging is displayed on the display portion 202, and the user input for designating any region in the subject image as the region-of-interest ROI is made on the operating portion 201. In addition, the region-of-interest ROI may be automatically set by the region setting portion 211. For example, a region corresponding to a pixel value of another peak than a peak whose pixel value is smallest among peaks appearing in a histogram of pixel values in the subject image can be extracted, and the region-of-interest ROI can be automatically set as the extracted region. In a case where there are other peaks like the aforementioned other peak, for example, a peak whose pixel value is smallest among the other peaks may be selected.

The non-region-of-interest NROI may be set based on a user input, similarly to the region-of-interest ROI, or may be automatically set by the region setting portion 211. For example, a region corresponding to the pixel value of the peak whose pixel value is smallest among the peaks appearing in the histogram of the pixel values in the subject image can be extracted, and the non-region-of-interest NROI can be automatically set as the extracted region.

In the subject image shown in FIG. 6, a band B indicating presence of a detection target appears at a predetermined position in each of the lane 1, the lane 3 and the lane 4. However, such a band does not appear in the lane 2. In this case, a possibility that the amount of the detection target included in the sample of the lane 2 is very small, and light emission of the sample of the lane 2 is feeble in comparison with the light exposure time of the pre-imaging may be considered. When the light emission of the sample is feeble in comparison with the light exposure time of the pre-imaging, the band which is present may be buried in noise so that the band cannot appear in the image.

In order to image the predetermined position of the lane 2 with a high SN ratio in main imaging, the region-of-interest ROI is set at the predetermined position of the lane L2 in the subject image shown in FIG. 6. In addition, the non-region-of-interest NROI is set at a region between the lane 1 and the lane 2, i.e. a region where the band is unlikely to be present.

Calculation of SN Ratio (Step S5)

The SN ratio of the region-of-interest ROI changes according to the light exposure time. The SN ratio changing according to the light exposure time is calculated by the SN ratio calculating portion 212. Here, the SN ratio calculating portion 212 calculates the SN ratio in consideration of a chronological characteristic of light emission or color development of the subject. When the SN ratio changing according to the light exposure time is SN(t), a signal component of the pixel value in which the chronological characteristic of the light emission or the color development of the subject has been taken into consideration is S(t), and a noise component of the pixel value is N(t), the SN(t) can be expressed by the following expression. Incidentally, the chronological characteristic of the light emission or the color development of the subject is a characteristic representing the relation between the passage of time and the intensity of the light emission or the color development.

$$SN(t) = S(t)/N(t) \tag{1}$$

Figure 7:
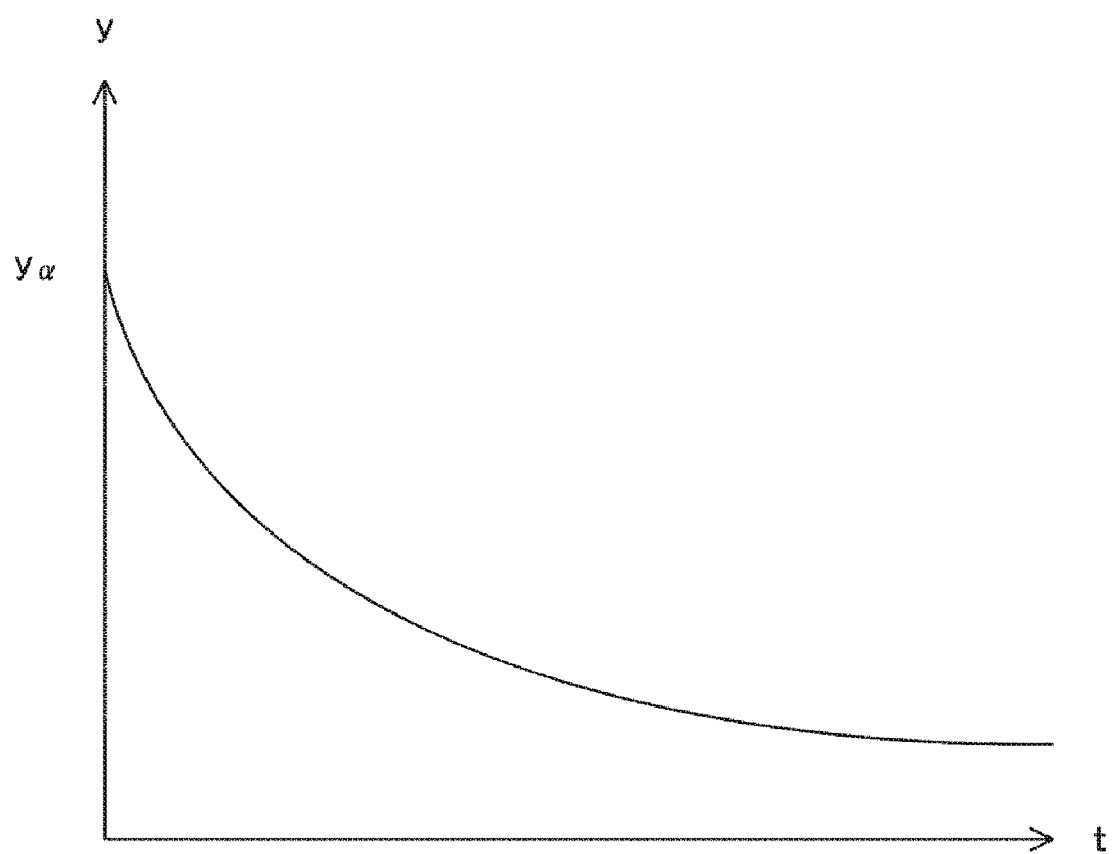
FIG. 7 is a graph of an example of a chronological characteristic of chemiluminescence.
Figure 8:
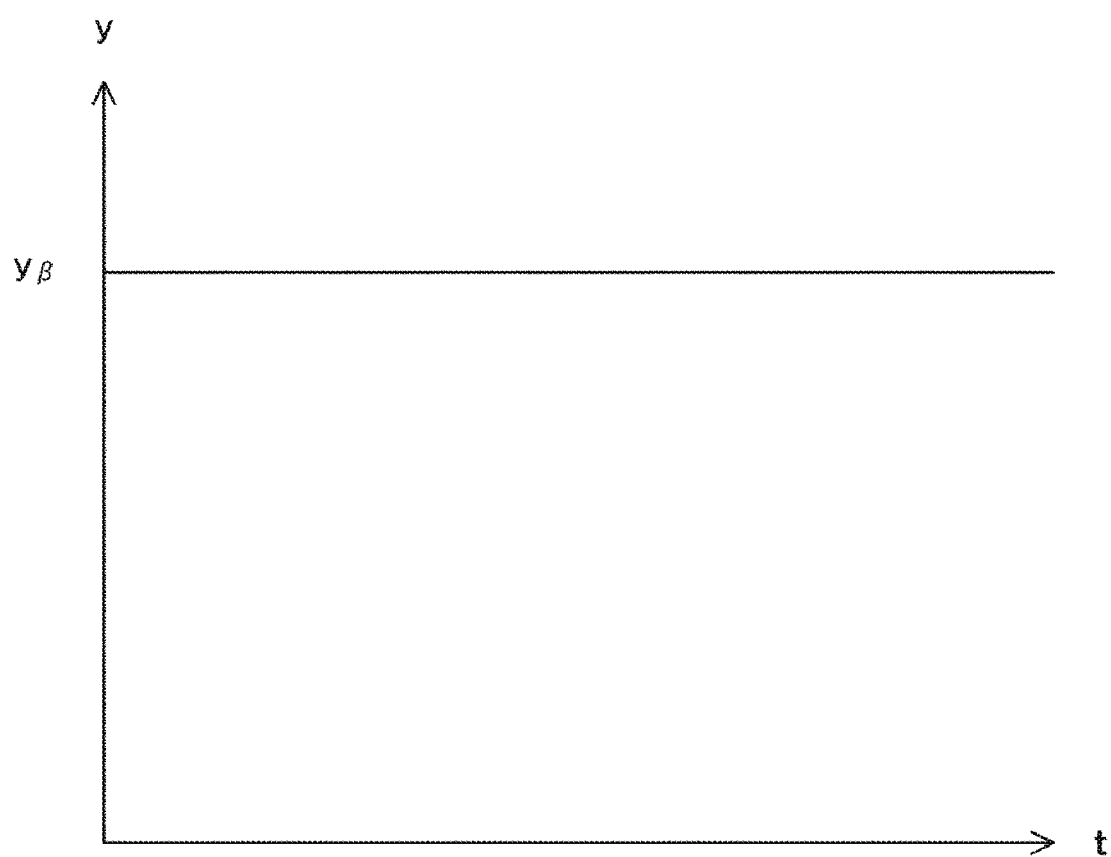
FIG. 8 is a graph of an example of a chronological characteristic of fluorescence.

FIG. 7 shows a chronological characteristic of light emission intensity of chemiluminescence. FIG. 8 shows a chronological characteristic of light emission intensity of fluorescence.

As shown in FIG. 7, the light emission intensity of the chemiluminescence may often attenuate exponentially in accordance with the following expression. This is because the light emission intensity of the chemiluminescence decreases as concentration of a reactant in an excited state decreases in accordance with the progress of a chemical reaction.

$$y = y_\alpha \cdot \exp(-k \cdot t) \tag{2}$$

in which $y_\alpha$ is a positive coefficient depending on concentration of a chemiluminescent substance, and k is a positive coefficient depending on a fading characteristic of light emission of the chemiluminescent substance.

As shown in FIG. 8, the light emission intensity of the fluorescence is ideally kept constant in accordance with the following expression as long as excitation light is supplied. This is because the fluorescence is emitted without causing destruction of a fluorescent sub stance.

$$y = y_\beta \tag{3}$$

in which $y_\beta$ is a positive coefficient depending on concentration of the fluorescent substance.

Incidentally, the light emission intensity of the fluorescence may attenuate according to the kind of the fluorescent substance. An attenuation rate of the light emission intensity of the fluorescence with respect to the passage of time is smaller than an attenuation rate of the light emission intensity of the chemiluminescence. Accordingly, the attenuating light emission intensity of the fluorescence can be approximated by the following linear function.

$$y = -\alpha \cdot t + y_\gamma \tag{4}$$

in which $y_\gamma$ is a positive coefficient depending on the concentration of the fluorescent substance, and a is a positive coefficient depending on a fading characteristic of light emission of the fluorescent substance.

Although now shown, color development intensity of a sample dyed by a CBB pigment or the like is constant, similarly to the light emission intensity of the fluorescence, or can be approximated by a linear function.

The coefficient k in the expression (2) can be obtained in advance for each chemiluminescent substance, and the coefficient a in the expression (4) can be also obtained in advance for each fluorescent substance and for each dyeing substance, and is stored in the storage portion 203. Assume that the subject kind set in the step S1 is classified by used reagents (the chemiluminescent substance, the fluorescent substance and the dyeing substance). In this case, the SN ratio calculating portion 212 determines an attenuation function corresponding to the subject kind among the expressions (2) to (4) based on the set subject kind. Therefore, the SN ratio calculating portion 212 determines the coefficient k when the attenuation function is the expression (2), or determines the coefficient a when the attenuation function is the expression (4).

Based on pixel values in the region-of-interest ROI and/or the non-region-of-interest NROI in the subject image based on the pre-imaging, the SN ratio calculating portion 212 obtains the coefficient $y_\alpha$ when the attenuation function is the expression (2), obtains the coefficient $y_\beta$ when the attenuation function is the function (3), or obtains the coefficient $y_\gamma$ when the attenuation function is the expression (4). Thus, the SN ratio calculating portion 212 derives the attenuation function y. A signal component of the pixel value in the subject image based on the pre-imaging can be, for example, set as a difference between an average of the pixel values in the region-of-interest ROI and an average of the pixel values in the non-region-of-interest NROI, as a difference between a median of the pixel values in the region-of-interest ROI and a median of the pixel values in the non-region-of-interest NROI, or as the average or the median of the pixel values in the region-of-interest ROI. Time integration of the derived attenuation function y corresponds to the signal component S(t) of the pixel value.

On the other hand, the noise component N(t) of the pixel value can be, for example, expressed by the following expression.

$$N(t) = \{Nf^2 + Nd^2 + Nr^2 + Ns^2\}^{1/2} \quad (5)$$

in which Nd is dark current noise of the imaging device 132, Nr is readout noise of the imaging device 132, and Nf is fixed pattern noise caused by a variation of sensitivity among the pixels of the imaging device 132. These noises Nd, Nr and Nf are obtained in advance and stored in the storage portion 203. In addition, the Ns is shot noise occurring due to a statistic change of photons incident on the imaging device 132. When an amount of signal charges generated in the imaging device 132 due to the incidence of the photons is S[e⁻], the Ns can be expressed by the following expression in accordance with Poisson statistics.

$$Ns = \sqrt{S} \quad (6)$$

The Ns is obtained based on the pixel values in the region-of-interest ROI and/or the non-region-of-interest NROI in the subject image based on the pre-imaging. For example, the Ns can be set as a standard deviation of the pixel values in the non-region-of-interest NROI or a standard deviation of the pixel values in the region-of-interest ROI.

Calculation of Total Light Exposure Time of Main Imaging (Step S6)

A total light exposure time of the main imaging is calculated by the total light exposure time calculating portion 213. The total light exposure time calculating portion 213 calculates the total light exposure time in which a preset reference SN ratio can be obtained, based on the SN(t) calculated by the SN ratio calculating portion 212. In addition, when the light emission fades, the S(t) attenuates but the N(t) increases so that the SN(t) approaches the peak. When the SN(t) has the peak in this manner, and a maximum SN ratio which is the peak value of the SN(t) is smaller than the reference SN ratio, the total light exposure time calculating portion 213 calculates the total light exposure time in which the maximum SN ratio can be obtained.

The reference SN ratio can be, for example, set as a standard SN ratio required of a subject image for analysis, and is stored in the storage portion 203. In addition, the reference SN ratio can be also set by the product of the SN ratio in the subject image used for setting the region-of-interest ROI and the non-region-of-interest NROI and an SN ratio improvement coefficient. For example, when the SN ratio in the subject image used for setting the region-of-interest ROI and the non-region-of-interest NROI is 2, and the improvement coefficient is 4, the reference SN ratio becomes 8 (2×4). The reference SN ratio improvement coefficient which provides the reference SN ratio is stored in the storage portion 203.

Figure 9:
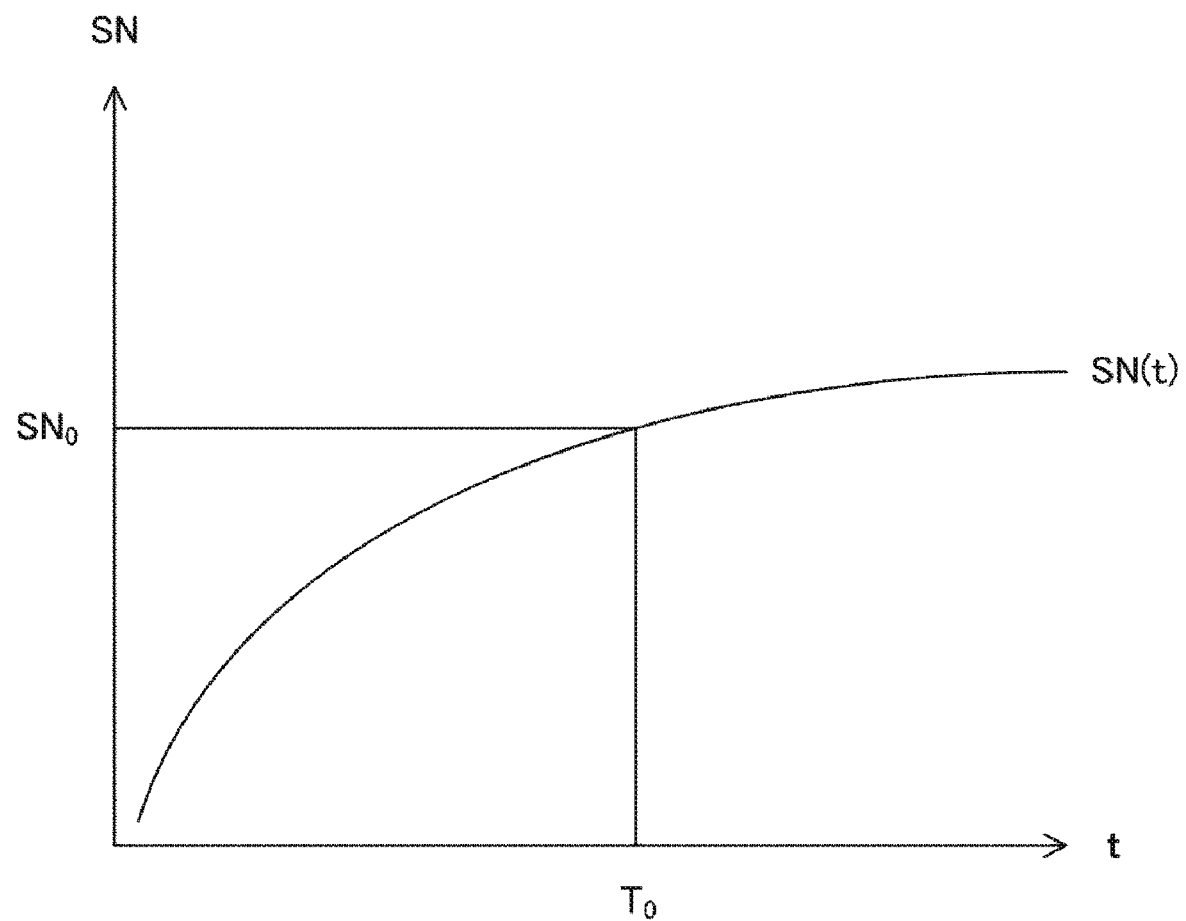
FIG. 9 is a schematic diagram of an example of an SN ratio.
Figure 10:
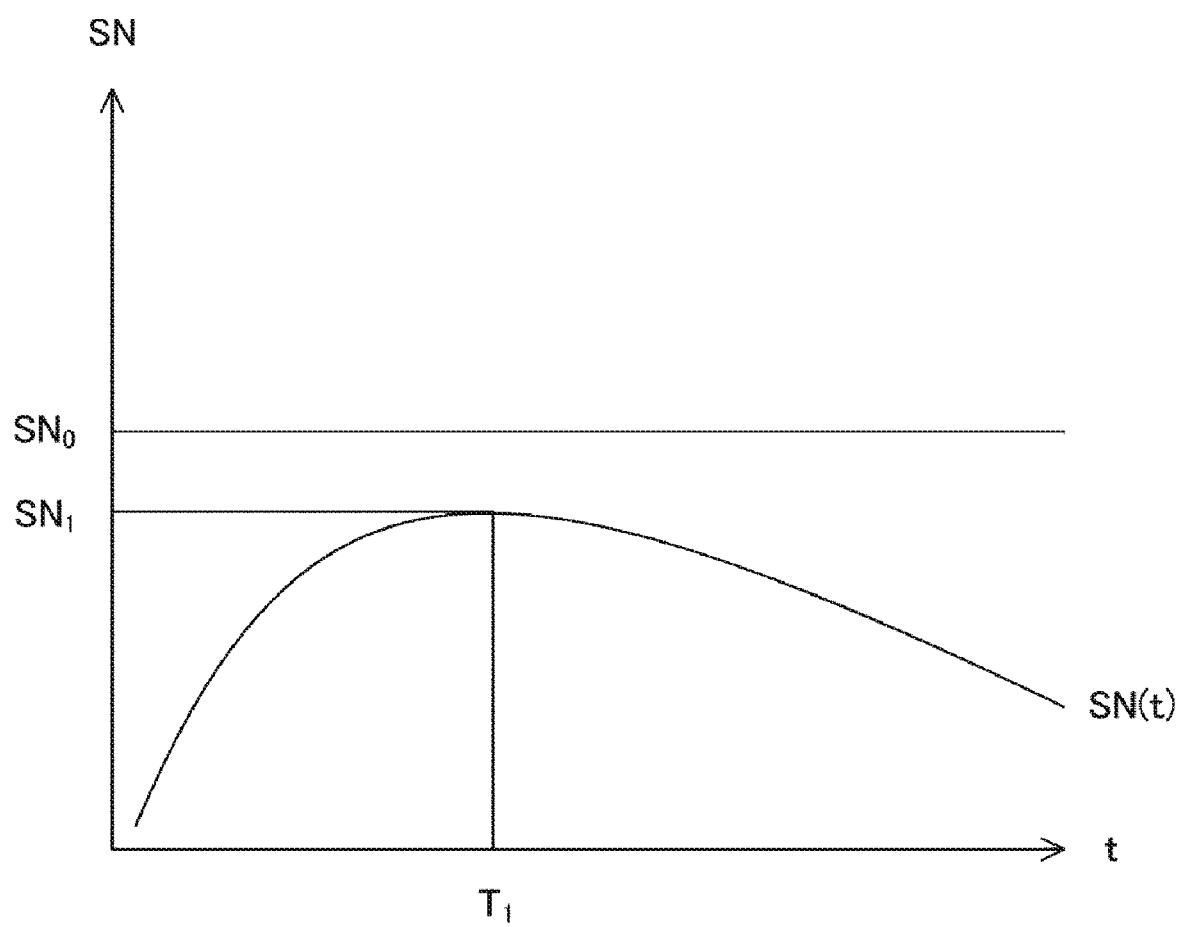
FIG. 10 is a schematic diagram of another example of the SN ratio.

FIG. 9 and FIG. 10 show an example of the SN ratio of the region-of-interest ROI changing according to the light exposure time.

FIG. 9 is a graph in which the SN(t) calculated by the SN ratio calculating portion 212 is shown with time as the abscissa and the SN ratio as the ordinate. The total light exposure time is obtained as a time $T_0$ in which a reference SN ratio $SN_0$ is provided in accordance with a characteristic line of the SN(t).

FIG. 10 shows a case where the SN(t) has a peak, and a maximum SN ratio $SN_1$ which is the peak value of the SN(t) is smaller than the reference SN ratio $SN_0$. In this case, the total light exposure time is obtained as a time $T_1$ in which the maximum SN ratio $SN_1$ is provided, in accordance with a characteristic line of the SN(t).

On the other hand, when the maximum SN ratio $SN_1$ is not smaller than the reference SN ratio $SN_0$, the total light exposure time may be obtained as the time $T_0$ in which the reference SN ratio $SN_0$ is provided or may be obtained as the time $T_1$ in which the maximum SN ratio $SN_1$ is provided. Preferably, a configuration is made so that one of the maximum SN ratio $SN_1$ and the reference SN ratio $SN_0$ to be used can be set based on a user input.

In addition, preferably, the total light exposure time calculated by the total light exposure time calculating portion 213 is displayed on the display portion 202. Thus, the user can know the total light exposure time required for the main imaging so that user-friendliness of the imaging system 1 is enhanced.

In addition, preferably, the reference SN ratio can be set based on a user input. When the reference SN ratio is reset based on the user input, the total light exposure time calculating portion 213 recalculates the total light exposure time in which the reset reference SN ratio can be obtained. Thus, the user can set a desired reference SN ratio while taking the balance between the SN ratio and the total light exposure time. Consequently, the user-friendliness of the imaging system 1 is enhanced. In the resetting of the reference SN ratio based on the user input, the reference SN ratio may be designated directly or may be designated indirectly through the reference SN ratio improvement coefficient.

In addition, preferably, the SN(t) calculated by the SN ratio calculating portion 212 is displayed on the display portion 202. The display form of the SN(t) is not limited particularly, but can be, for example, displayed as the graph shown in FIG. 9. By the display of the SN(t), the user can easily grasp the relation between the SN ratio and the total light exposure time. Thus, the user can easily set a desired reference SN ratio while taking the balance between the SN ratio and the total light exposure time. Consequently, the user-friendliness of the imaging system 1 is further enhanced.

Main Imaging (Step S7) and Generation of Subject Image (Step S8)

The control portion 205 enables the imaging apparatus 100 to perform the main imaging based on the total light exposure time calculated by the total light exposure time calculating portion 213. Here, assume that the main imaging is performed only once. In this case, the imaging device 132 is exposed to light continuously in the total light exposure time. A photographic image taken by the one time of the main imaging is set as the subject image.

In the subject image obtained by the main imaging in the aforementioned manner, the region-of-interest ROI of the subject image is set based on a user input. The total light exposure time of the main imaging is set so that the SN ratio of the region-of-interest ROI can correspond to the reference SN ratio in the subject image based on the main imaging. Accordingly, for example, even a feeble band not appearing in the photographic image based on the pre-imaging can be captured at the reference SN ratio in the subject image based on the main imaging. Thus, a subject whose light emission or color development distribution is unknown can be imaged with a high SN ratio and in a proper light exposure time.

Incidentally, when the reference SN ratio is reset based on a user input, the total light exposure time of the main imaging is indirectly adjusted through the reference SN ratio. On the other hand, when the total light exposure time of the main imaging can be set based on a user input, the total light exposure time may be adjusted directly. When the total light exposure time can be set based on the user input, preferably, the control portion 205 enables the imaging apparatus 100 to perform the main imaging based on a shorter total light exposure time of the total light exposure time calculated by the total light exposure time calculated by the total light exposure time calculating portion 213 and the total light exposure time set based on the user input. Thus, when the calculated total light exposure time is comparatively short, the reference SN ratio can be obtained in a shortest time. When the set total light exposure time is comparatively short, the best SN ratio can be obtained within the total light exposure time allowed by the user. Thus, the user-friendliness of the imaging system 1 is further enhanced.

In addition, an upper limit of the total light exposure time of the main imaging may be set in advance. When the total light exposure time calculated by the total light exposure time calculating portion 213 or the total light exposure time set based on the user input exceeds the upper limit of the total light exposure time which has been set in advance, the imaging is preferable interrupted as soon as the light exposure time in the main imaging reaches the upper limit of the total light exposure time. The upper limit of the total light exposure time may differ from one subject kind to another. For example, in consideration of the fact that the light emission intensity of the fluorescence lasts longer than the light emission intensity of the chemiluminescence, the upper limit of the total light exposure time corresponding to a subject emitting the fluorescence may be set to be shorter than the upper limit of the total light exposure time corresponding to a subject emitting the chemiluminescence.

In addition, from the viewpoint of enhancing the user-friendliness of the imaging system 1, the control portion 205 may interrupt the imaging when a user input for interrupting the imaging is accepted by the operating portion 201.

The case in which the main imaging is performed only once has been described so far. However, the main imaging may be performed multiple times.

Figure 11:
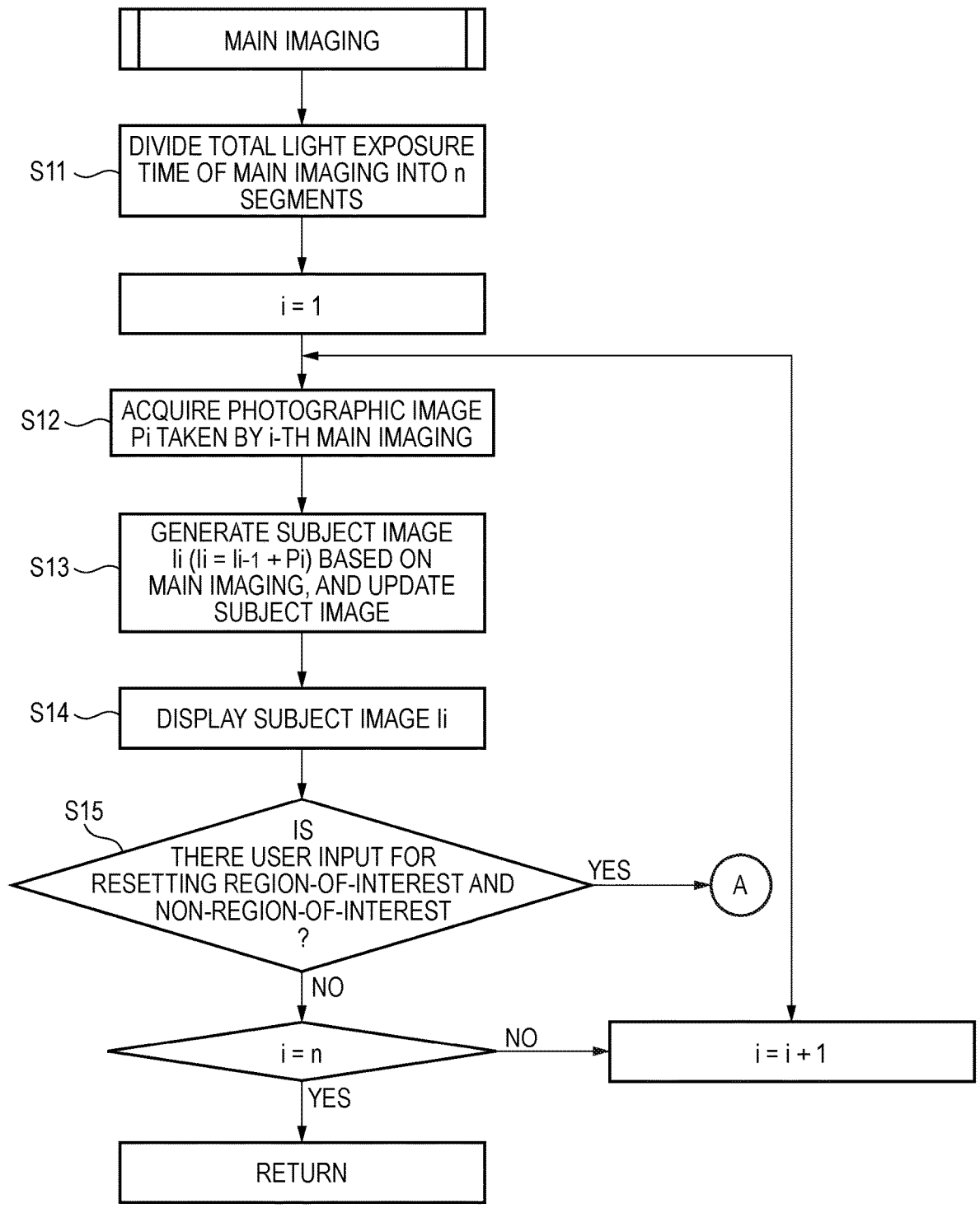
FIG. 11 is a flow chart of an example of an imaging process for main imaging in a case where the main imaging is performed multiple times.

FIG. 11 shows a flow chart of an imaging process for the main imaging in the case where the main imaging is performed multiple times.

Assume that the main imaging is performed n times. In this case, the control portion 205 divides the total light exposure time into n segments (step S11). The number n of the segments is, for example, set based on a user input. The total light exposure time is, for example, divided into fixed light exposure times. The control portion 205 enables the imaging apparatus 100 to perform the main imaging n times (step S12) so that the imaging device 132 is exposed to light intermittently multiple times in accordance with the segments of the total light exposure time.

Here, the image generating portion 210 adds up n photographic images $P_i$ taken by the n times of the main imaging, so as to generate a subject image I based on the main imaging and updates the subject image I whenever the main imaging is performed (step S13). A subject image $I_k$ at a stage where the k-th main imaging has been performed is an image in which photographic images $P_1$ to $P_k$ have been added up as expressed by the following expression.

$$I_k = P_1 + P_2 + \ldots + P_k = I_{k-1} + P_k \quad (7)$$

A pixel value in the region-of-interest ROI of the subject image $I_n$ generated by adding up the n photographic images $P_i$ is the simple sum of the $P_i$. On the other hand, in the subject image $I_n$, noise expressed by the expression (5) is an average of the sum of squares. Accordingly, the SN ratio of the region-of-interest ROI of the subject image $I_n$ increases.

In addition, the photographic image $P_i$ taken during the main imaging is added to the subject image $I_{i-1}$ whenever the main imaging is performed. Accordingly, the SN ratio of the region-of-interest ROI increases gradually. Thus, the user can check whether the setting of the region-of-interest ROI is suitable or not without waiting for completion of the n times of the main imaging. Thus, the user-friendliness of the imaging system 1 is further enhanced.

Incidentally, in the case where the upper limit of the total light exposure time of the main imaging has been set in advance, imaging is preferably interrupted as soon as the total sum of the light exposure times added every time when imaging is performed reaches the upper limit of the total light exposure time which has been set in advance. In addition, an upper limit of a light exposure time per imaging may be set in advance, and imaging may be interrupted as soon as the light exposure time in any of the multiple times of the main imaging exceeds the upper limit of the light exposure time which has been set in advance. The upper limit of the light exposure time may differ from one subject kind to another, similarly to the upper limit of the total light exposure time. For example, the upper limit of the light exposure time corresponding to a subject emitting fluorescence can be set to be shorter than the upper limit of the light exposure time corresponding to a subject emitting chemiluminescence.

Figure 12A:
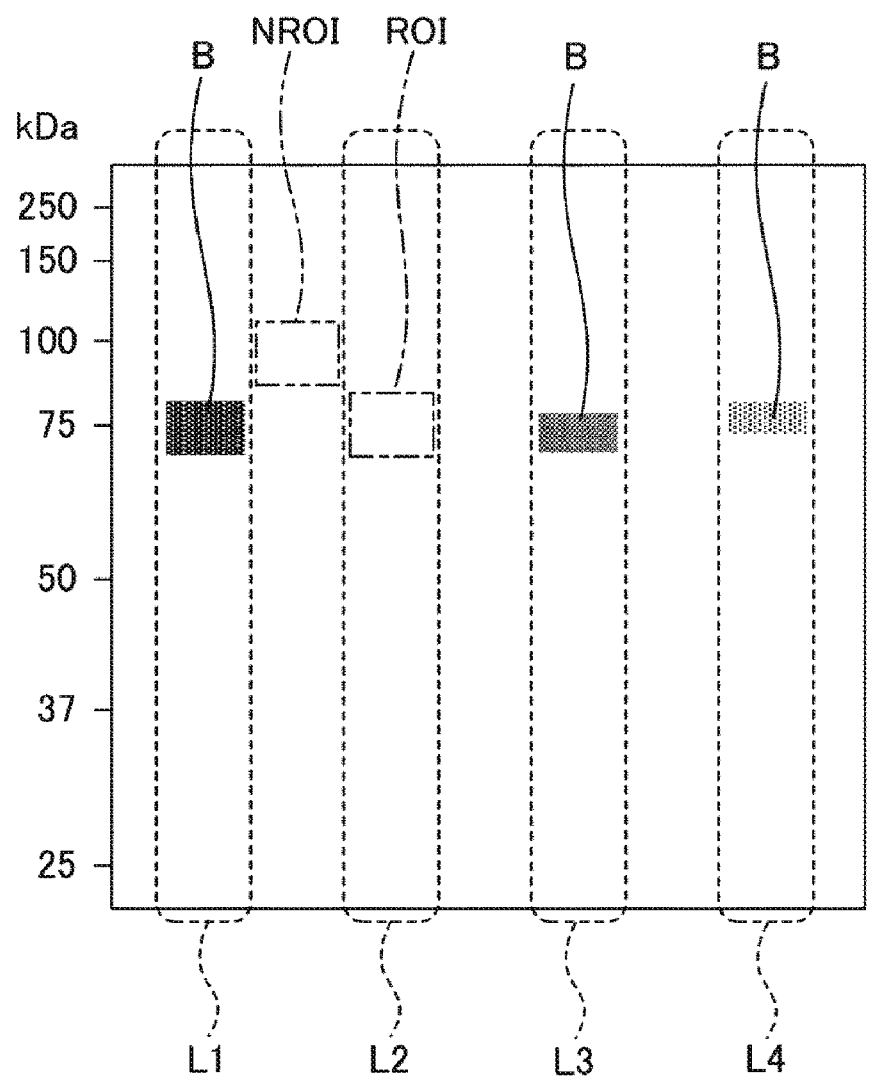
FIG. 12A is a schematic diagram of a subject image $I_k$ at a stage where k-th main imaging has been performed.
Figure 12B:
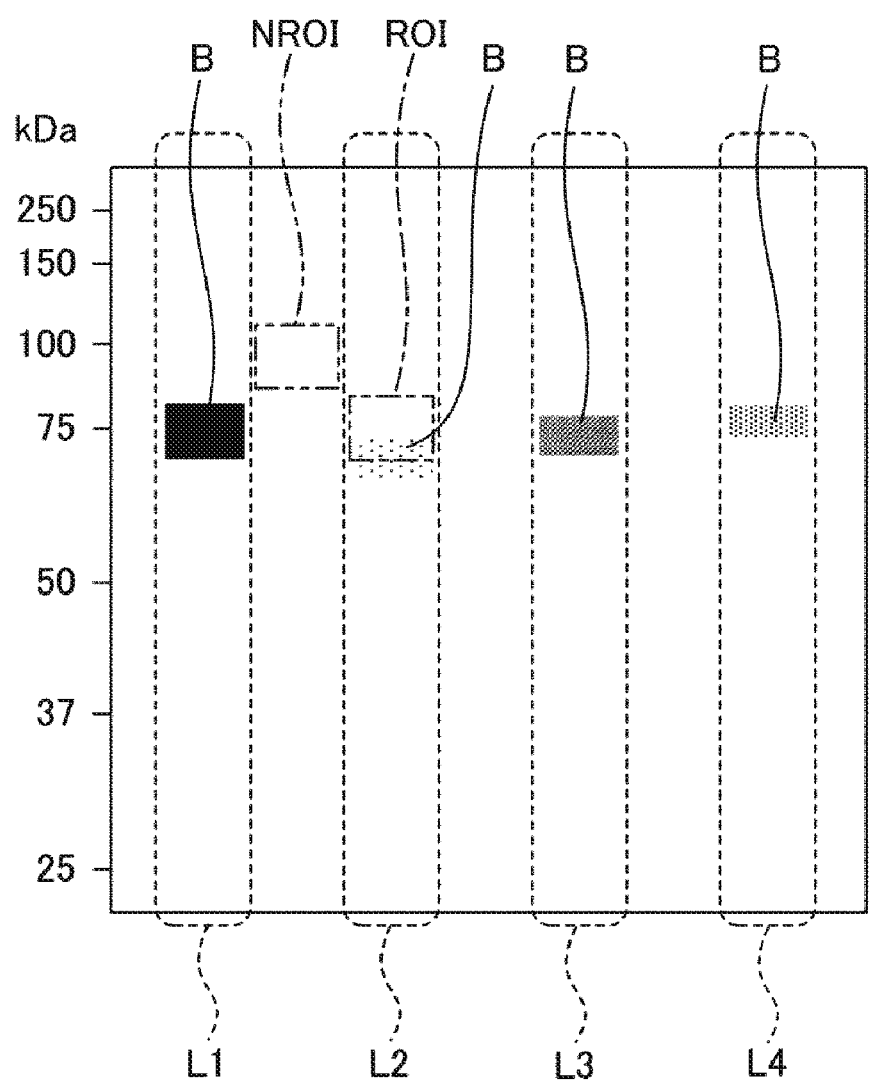
FIG. 12B is a schematic diagram of a subject image $I_{k+1}$ at a stage where (k+1)th main imaging has been performed.
Figure 12C:
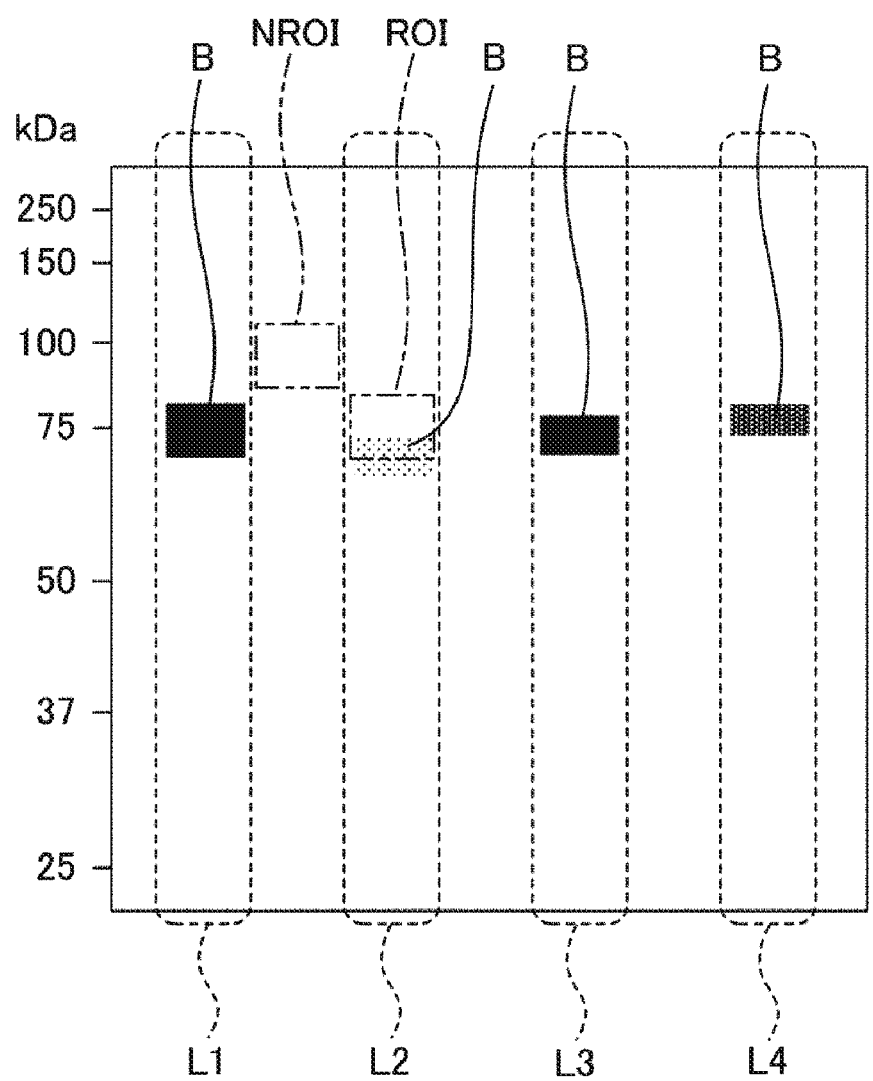
FIG. 12C is a schematic diagram of a subject image $I_{k+2}$ at a stage where (k+2)th main imaging has been performed.

FIG. 12A to FIG. 12C are subject images taken by the main imaging on the same samples as those in the example shown in FIG. 6. FIG. 12A is the subject image $I_k$ at the stage where the k-th main imaging has been performed. FIG. 12B is a subject image $I_{k+1}$ at a stage where the (k+1)th main imaging has been performed. FIG. 12C is a subject image $I_{k+2}$ at a stage where the (k+2)th main imaging has been performed.

As the SN ratio of the region-of-interest ROI increases gradually, the band of the lane L2 that did not appear in the subject image $I_k$ shown in FIG. 12A is gradually revealed in the image whenever the main imaging is performed. As a result, the band of the land L2 in the subject image $I_{k+2}$ shown in FIG. 12C appears in the image to a visually recognizable level. Thus, the user can check whether the setting of the region-of-interest ROI is suitable or not without waiting for completion of the n times of the main imaging.

Here, in the example shown in FIG. 12C, the region-of-interest ROI which has been set is slightly displaced from the band B of the lane L2. In such a case, the imaging may be interrupted. However, it is desirable that the region-of-interest ROI is reset to agree with the band B of the lane L2 appearing in the subject image $I_{k+2}$.

Refer to FIG. 11 again. Whenever the subject image is updated, the control portion 205 displays the updated subject image on the display portion 202 (step S14). When a user input for designating any region in the subject image I displayed on the display portion 202 as the region-of-interest ROI is made on the operating portion 201 (Yes in step S15), the region setting portion 211 returns to the aforementioned step S4 (see FIG. 5) to reset the region-of-interest ROI and the non-region-of-interest NROI.

The SN ratio calculating portion 212 recalculates the SN(t) based on the reset region-of-interest ROI and the reset non-region-of-interest NROI (the step S5). The total light exposure time calculating portion 213 recalculates the total light exposure time in which the reference SN ratio can be obtained, based on the recalculated SN(t) (the step S6). The control portion 205 enables the imaging apparatus 100 to perform the main imaging based on the recalculated total light exposure time (the step S7).

Thus, the region-of-interest ROI is allowed to be reset even during the main imaging. Accordingly, efficiency of the imaging process can be improved in comparison with a case where the imaging process is started over from the pre-imaging.

Here, there is a case where the SN ratio of the region-of-interest ROI in the updated subject image decreases due to attenuation of the light emission intensity or the color development intensity of the subject. Preferably, whether the change rate of the SN ratio is lower than a predetermined value or not is determined by the control portion 205 based on the change in the SN ratio. Therefore, the imaging is interrupted when the change rate of the SN ratio is lower than the predetermined value. When the imaging is interrupted due to the fact that the change rate of the SN ratio is lower than the predetermined value, preferably, of the subject images which have been generated till the interruption of the imaging, a subject image having a maximum SN ratio is displayed on the display portion 202 and stored. When, for example, the SN ratio of the region-of-interest ROI in the subject image $I_k$ at the stage where the k-th main imaging has been performed is $SN_k$, and n is an integer not smaller than 1, the change rate of the SN ratio can be expressed by an inclination of a straight line which is obtained by linear approximation on $SN_{k-n}$, $SN_{k-(n+1)}$, . . . , $SN_k$. When the change rate of the SN ratio is expressed by the inclination of the straight line obtained by the linear approximation on the SN ratios of the subject images, the predetermined value applied to the change rate of the SN rate is, for example, 0. Of the subject images $SN_{k-n}$, $SN_{k-(n+1)}$, . . . , $SN_k$, the subject image which provides the maximum SN ratio is displayed on the display portion 202 and stored.

Incidentally, while the main imaging is performed, the total light exposure time calculated by the total light exposure time calculating portion 213 is preferably also displayed on the display portion 202. In addition, the reference SN ratio can be preferably set based on a user input. When the reference SN ratio is reset based on the user input, the total light exposure time calculating portion 213 recalculates the total light exposure time in which the reset reference SN ratio can be obtained. In addition, the SN(t) calculated by the SN ratio calculating portion 212 is preferably displayed on the display portion 202.

Figure 13:
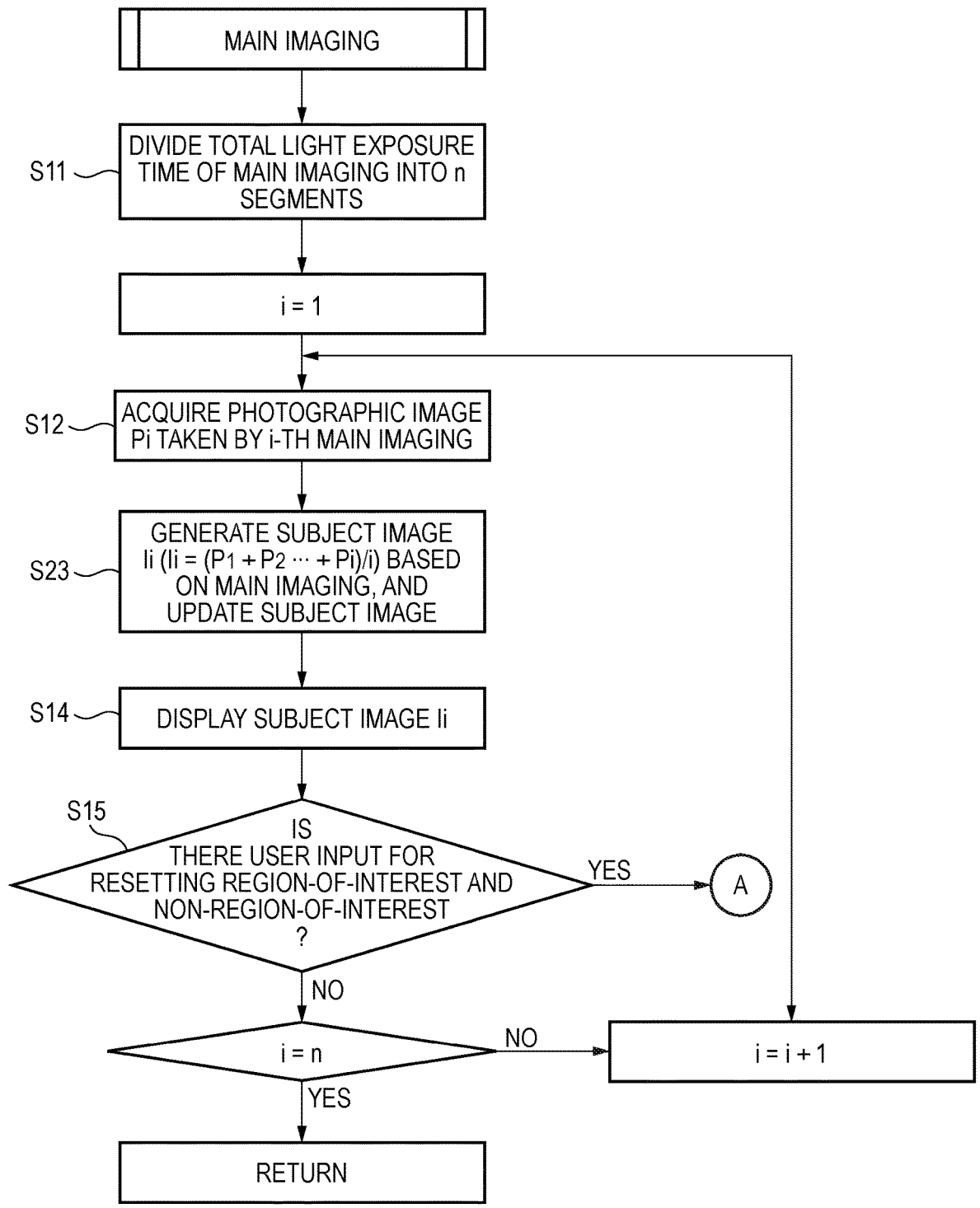
FIG. 13 is a flow chart of another example of the imaging process for the main imaging in the case where the main imaging is performed multiple times.

FIG. 13 shows another flow chart of the imaging process for the main imaging in the case where the main imaging is performed multiple times.

In the example shown in FIG. 13, the image generating portion 210 obtains an arithmetic average of n photographic images $P_i$ taken by n times of the main imaging so as to generate a subject image I based on the main imaging, and updates the subject image I whenever the main imaging is performed. A subject image $I_k$ at a stage where the k-th main imaging has been performed is an image in which the photographic images $P_1$ to $P_k$ have been arithmetically averaged as expressed by the following expression (step S23).

$$I_k=(P_1+P_2+ \ldots +P_k)/k \quad (8)$$

When the n photographic images $P_i$ are arithmetically averaged, noise is also averaged among the n photographic images $P_i$. The noise is added at random to each of the pixels of the photographic images and further compressed due to the averaging, therefore leading to advantage to improvement of the SN ratio in the subject image I based on the main imaging.

When the n photographic images $P_i$ are arithmetically averaged to generate the subject image I based on the main imaging, a shortest saturation light exposure time TS is preferably calculated by the saturation light exposure time calculating portion 214. When the total light exposure time is divided into segments, the control portion 205 sets a number n of the segments and divides the total light exposure time into the n segments to make the light exposure time of any divided segment shorter than the saturation light exposure time TS. Incidentally, the shortest saturation light exposure time TS is a shortest time when a pixel whose pixel value has reached a saturation region appears in a photographic image taken by the main imaging. The shortest saturation light exposure time TS can be calculated based on one or more photographic images which have been taken by the pre-imaging and the main imaging. The saturation region is a region including an upper limit the pixel value can take and vicinities of the upper limit. In other words, the saturation region is a region where a proportional relation between photons incident on the pixel of the imaging device 132 and signal charges generated in the pixel is lost.

For example, in the examples shown in FIGS. 12A to 12C, pixel values of pixels corresponding to the bands B of the lane L1, the lane L3 and the lane L4 increase whenever a photographic image is added. The pixel values of the pixels corresponding to the bands B of the lane L1 and the lane L3 in the subject image $I_k$ shown in FIG. 12C have reached the saturation region. In this case, in each of the samples of the lane L1 and the lane L3, a detection target can be detected but cannot be quantitatively determined. On the other hand, the light exposure time in each of the n times of the main imaging is shorter than the saturation light exposure time TS. Accordingly, any pixel which has reached the saturation region does not appear in the n photographic images $P_i$ and also does not appear in the subject image I which is generated by arithmetically averaging the n photographic images $P_i$. That is, the pixel values of the pixels corresponding to the bands B of the lane L1 and the lane L3 do not reach the saturation region, so that the detection targets can be detected and quantitatively determined in all the samples of the lanes L1 to L4 including the lane L2.

In addition, the light exposure time in each of the n times of the main imaging is preferably set to be longer as the main imaging is later.

Figure 14:
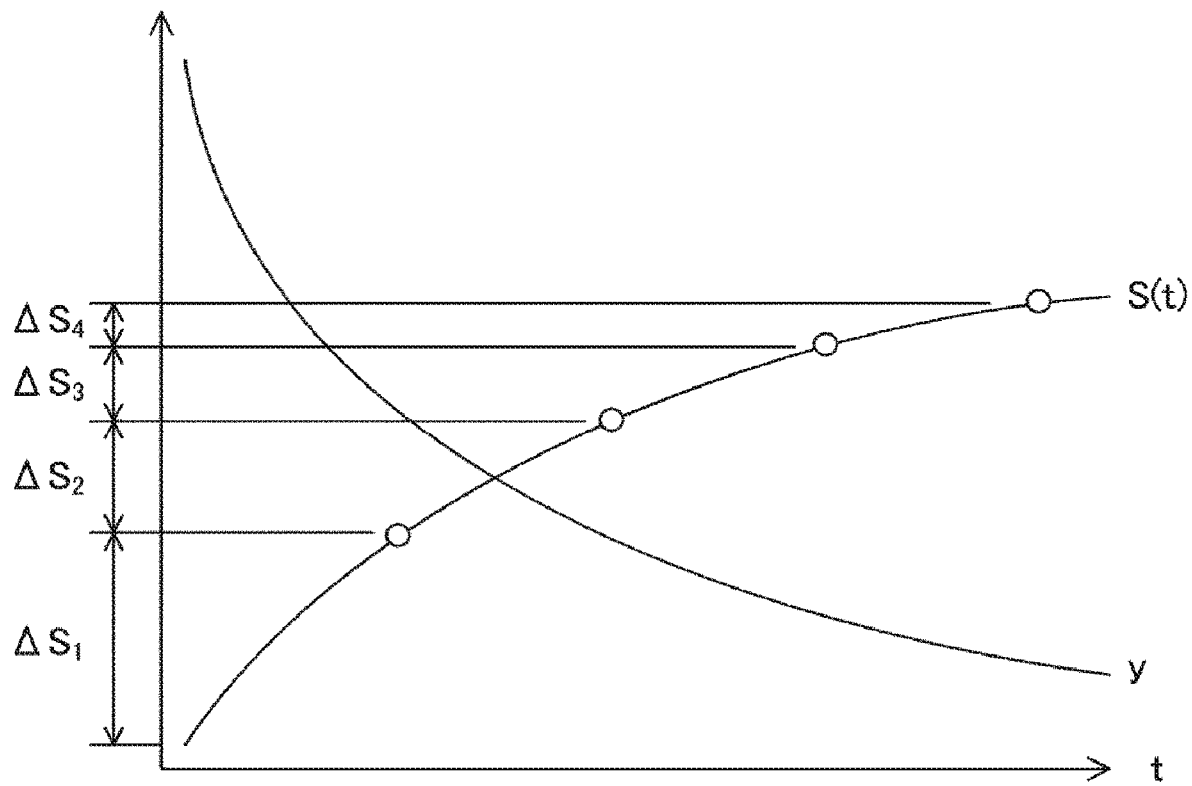
FIG. 14 is a graph showing a pixel value for each photographic image in a case where a total light exposure time of the main imaging is divided into segments in which light exposure time is fixed.
Figure 15:
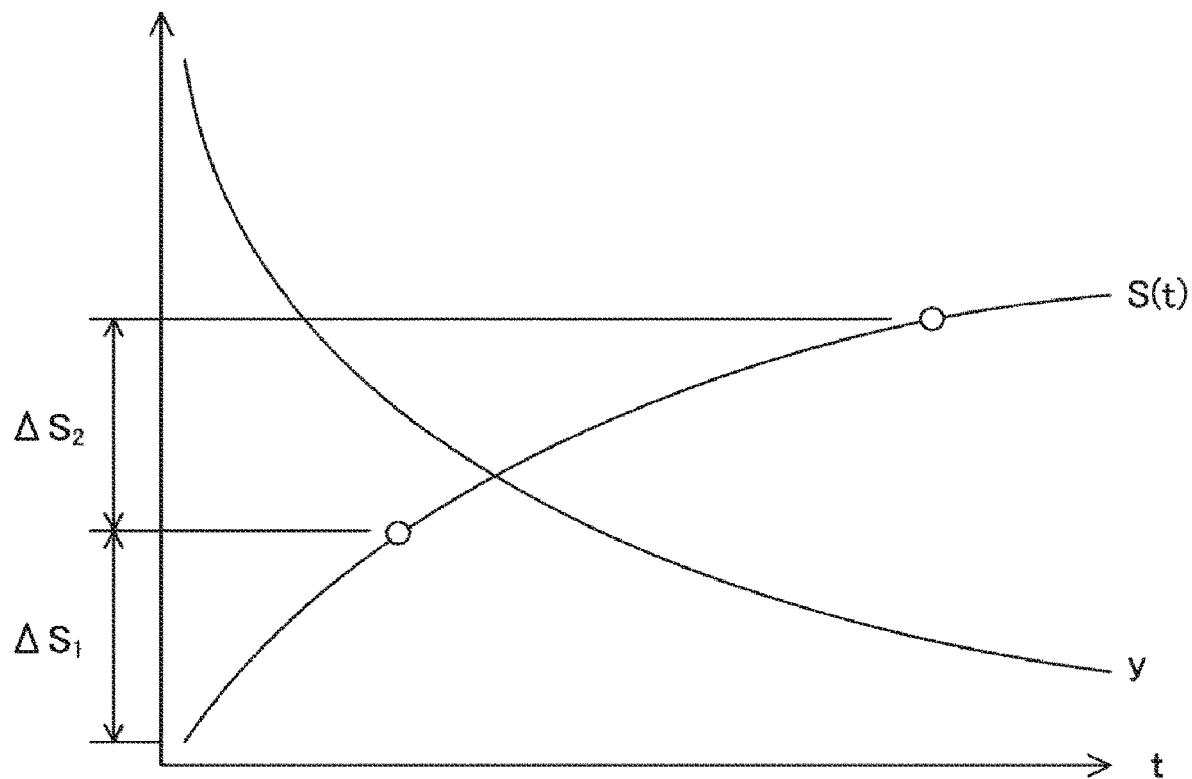
FIG. 15 is a graph showing a pixel value for each photographic image in a case where the total light exposure time of the main imaging is divided into segments in which light exposure time is made longer as the main imaging is later.

FIG. 14 and FIG. 15 show a chronological characteristic of light emission in which intensity of the light emission attenuates with the passage of time, and a pixel value S(t) in the region-of-interest ROI in which the chronological characteristic of the light emission has been taken into consideration. FIG. 14 shows the pixel value obtained for each photographic image when the total light exposure time of the main imaging is divided into segments in which light exposure time is fixed. FIG. 15 shows the pixel value obtained for each photographic image when the total light exposure time of the main imaging is divided into segments in which light exposure time is set to be longer as the main imaging is later.

When the total light exposure time of the main imaging is divided into the segments in which the light exposure time is fixed as shown in FIG. 14, a pixel value $\Delta S_i$ obtained for each photographic image is smaller as the photographic image is taken by the later main imaging. In this case, noise is dominant in the photographic image taken by the later main imaging. There is a concern that the SN ratio may be lowered because the photographic image where the noise is dominant is included in the photographic images which will be added up and averaged.

On the other hand, the total light exposure time of the main imaging is divided into the segments in which the light exposure time is set to be longer as the main imaging is later, as shown in FIG. 15. Accordingly, a pixel value $\Delta S_i$ obtained for each photographic image is, for example, fixed so that the influence of noise can be averaged among the photographic images, therefore leading to advantage to improvement of the SN ratio. On this occasion, when the light exposure time of i-th imaging is $t_i$ and a weight in each imaging is $1/t_i$, a subject image I based on the main imaging may be generated by weighted averaging the photographic images. That is, a subject image $I_k$ at a stage where the k-th main imaging has been performed is an image in which the photographic images $P_1$ to $P_k$ have been weighted averaged as expressed by the following expression.

$$I_k = (P_1/t_1 + P_2/t_2 + \ldots P_k/t_k)/(1/t_1 + 1/t_2 + \ldots + 1/t_k) \quad (9)$$

As described above, the imaging system disclosed in the description of the present invention is an imaging system including: an imaging unit that images a subject; and a control unit that enables the imaging unit to perform pre-imaging one or more times, and main imaging one or more times following the pre-imaging; wherein: the control unit has an image generating portion that generates a subject image based on one or more taken images in each of the pre-imaging and the main imaging, an interface portion that displays the subject image and accepts a user input for setting at least a region-of-interest, of the region-of-interest and a non-region-of-interest of the subject image, a region setting portion that sets the region-of-interest based on the user input, and sets the non-region-of-interest, an SN ratio calculating portion that calculates an SN ratio which is a ratio of a signal component of a pixel value to a noise component of the pixel value based on the set region-of-interest and the set non-region-of-interest, and a total light exposure time calculating portion that calculates a total light exposure time in which a maximum SN ratio or a preset reference SN ratio can be obtained, based on the SN ratio calculated for the one or more taken images; and the control unit enables the imaging unit to perform the main imaging based on the total light exposure time.

In addition, the imaging system disclosed in the description of the present invention is an imaging system including: an imaging unit that images a subject; and a control unit that enables the imaging unit to perform pre-imaging one or more times, and main imaging one or more times following the pre-imaging; wherein: the control unit has an image generating portion that generates a subject image based on one or more taken images in each of the pre-imaging and the main imaging, an interface portion that displays the subject image, a region setting portion that sets a region-of-interest and a non-region-of-interest of the subject image, an SN ratio calculating portion that calculates an SN ratio which is a ratio of a signal component of a pixel value to a noise component of the pixel value based on the set region-of-interest and the set non-region-of-interest, and a total light exposure time calculating portion that calculates a total light exposure time in which a maximum SN ratio or a preset reference SN ratio can be obtained, based on the SN ratio calculated for the one or more taken images; and the control unit enables the imaging unit to perform the main imaging based on the total light exposure time.

In addition, in the imaging system disclosed in the description of the present invention, the signal component of the pixel value is a difference between an average or a median of pixel values in the set region-of-interest and an average or a median of pixel values in the set non-region-of-interest.

In addition, in the imaging system disclosed in the description of the present invention, the noise component of the pixel value is a standard deviation of pixel values in the set non-region-of-interest.

In addition, in the imaging system disclosed in the description of the present invention, the reference SN ratio is set as the product of an SN ratio in the subject image that is used by the region setting portion for setting the region-of-interest and the non-region-of-interest, and a reference SN ratio improvement coefficient that is set in advance.

In addition, in the imaging system disclosed in the description of the present invention, the interface portion accepts a user input for setting the reference SN ratio or the reference SN ratio improvement coefficient.

In addition, in the imaging system disclosed in the description of the present invention, the interface portion accepts a user input for selecting one of the maximum SN ratio and the reference SN ratio to be used for calculating the total light exposure time.

In addition, in the imaging system disclosed in the description of the present invention, the control unit divides the total light exposure time into segments, and enables the imaging unit to perform the main imaging multiple times in which light exposure is performed in accordance with the segments; the image generating portion obtains an arithmetic average or a weighted average of images taken by the multiple times of the main imaging so as to generate the subject image, and updates the subject image whenever the main imaging is performed; and the interface portion displays the updated subject image.

In addition, in the imaging system disclosed in the description of the present invention, the control unit determines whether a change rate of the SN ratio in the updated subject image is lower than a predetermined value or not, based on a change in the SN ratio, and interrupts imaging when the change rate of the SN ratio is lower than the predetermined value.

In addition, in the imaging system disclosed in the description of the present invention, when the imaging has been interrupted, the interface portion displays, of the subject images generated till the interruption of the imaging, the subject image in which the SN ratio is maximum.

In addition, in the imaging system disclosed in the description of the present invention, when the interface portion accepts a user input for setting a region-of-interest of the updated subject image, the region setting portion resets the region-of-interest based on the user input, and resets the non-region-of-interest, the SN ratio calculating portion recalculates the SN ratio based on the reset region-of-interest and the reset non-region-of-interest, and the total light exposure time calculating portion recalculates the total light exposure time based on the recalculated SN ratio.

In addition, in the imaging system disclosed in the description of the present invention, the control unit has a saturation light exposure time calculating portion that calculates a shortest saturation light exposure time when a pixel whose pixel value has reached a saturation region appears in an image taken by the main imaging, based on one or more taken images; and a light exposure time in each of the multiple times of the main imaging is shorter than the calculated saturation light exposure time.

In addition, in the imaging system disclosed in the description of the present invention, the control unit divides the total light exposure time into segments, and enables the imaging unit to perform the main imaging multiple times in which light exposure is performed in accordance with the segments; the image generating portion adds up images taken by the multiple times of the main imaging so as to generate the subject image, and updates the subject image whenever the main image is performed; and the interface portion displays the updated subject image.

In addition, in the imaging system disclosed in the description of the present invention, when the interface portion accepts a user input for setting a region-of-interest of the updated subject image, the region setting portion resets the region-of-interest based on the user input, and resets the non-region-of-interest, the SN ratio calculating portion recalculates the SN ratio based on the reset region-of-interest and the reset non-region-of-interest, and the total light exposure time calculating portion recalculates the total light exposure time based on the recalculated SN ratio.

In addition, in the imaging system disclosed in the description of the present invention, a light exposure time in each of the multiple times of the main imaging is set to be longer as the main imaging is later.

In addition, in the imaging system disclosed in the description of the present invention, whenever the subject image is updated, the SN ratio calculating portion calculates the SN ratio, and the total light exposure time calculating portion calculates the total light exposure time.

In addition, in the imaging system disclosed in the description of the present invention, the interface portion displays the calculated SN ratio and the calculated total light exposure time.

In addition, in the imaging system disclosed in the description of the present invention, when the interface portion accepts a user input for resetting the reference SN ratio, the total light exposure time calculating portion recalculates a total light exposure time in which the reset reference SN ratio can be obtained.

In addition, in the imaging system disclosed in the description of the present invention, when the interface portion accepts a user input for setting the total light exposure time, the control unit enables the imaging unit to perform the main imaging based on a shorter total light exposure time of the calculated total light exposure time and the set total light exposure time.

In addition, in the imaging system disclosed in the description of the present invention, when the interface portion accepts a user input for interrupting imaging, the control unit interrupts the imaging.

In addition, in the imaging system disclosed in the description of the present invention, when the total of light exposure times in the multiple times of the main imaging exceeds an upper limit total light exposure time that is set in advance, the control unit interrupts imaging.

In addition, in the imaging system disclosed in the description of the present invention, the upper limit total light exposure time differs from one subject kind to another, so that the upper limit total light exposure time corresponding to a subject emitting fluorescence is shorter than the upper limit total light exposure time corresponding to a subject emitting light as a result of a chemical reaction.

In addition, in the imaging system disclosed in the description of the present invention, when the light exposure time in each of the multiple times of the main imaging exceeds an upper limit light exposure time that is set in advance, the control unit interrupts imaging.

In addition, in the imaging system disclosed in the description of the present invention, the upper limit light exposure time differs from one subject kind to another, so that the upper limit light exposure time corresponding to a subject emitting fluorescence is shorter than the upper limit light exposure time corresponding to a subject emitting light as a result of a chemical reaction.

In addition, in the imaging system disclosed in the description of the present invention, the interface portion accepts a user input for setting a subject kind; and the control portion has a storage portion that stores imaging conditions for each subject kind so that the control unit enables the imaging unit to perform the pre-imaging based on the imaging conditions corresponding to the set subject kind.

In addition, the imaging system disclosed in the description of the present invention images a subject emitting light.

In addition, the imaging system disclosed in the description of the present invention images a subject whose light emission intensity attenuates with passage of time.

In addition, the imaging method disclosed in the description of the present invention is an imaging method including the steps of: performing pre-imaging one or more times by use of an imaging unit imaging a subject; generating a subject image based on one or more images taken by the pre-imaging; displaying the generated subject image, setting a region-of-interest of the subject image based on a user input, and setting a non-region-of-interest of the subject image; calculating an SN ratio which is a ratio of a signal component of a pixel value to a noise component of the pixel value based on the set region-of-interest and the set non-region-of-interest; calculating a total light exposure time in which a maximum SN ratio or a preset reference SN ration can be obtained, based on the SN ratio calculated for the one or more taken images; performing main imaging one or more times based on the total light exposure time by use of the imaging unit; and generating a subject image based on one or more images taken by the main imaging.

In addition, the imaging method disclosed in the description of the present invention images a subject emitting light.

In addition, the imaging method disclosed in the description of the present invention is an imaging method including the steps of: performing pre-imaging one or more times by use of an imaging unit imaging a subject; generating a subject image based on one or more images taken by the pre-imaging; setting a region-of-interest and a non-region-of-interest of the subject image; calculating an SN ratio which is a ratio of a signal component of a pixel value to a noise component of the pixel value based on the set region-of-interest and the set non-region-of-interest; calculating a total light exposure time in which a maximum SN ratio or a preset reference SN ration can be obtained, based on the SN ratio calculated for the one or more taken images; performing main imaging one or more times based on the total light exposure time by use of the imaging unit; and generating a subject image based on one or more images taken by the main imaging.

In addition, the imaging method disclosed in the description of the present invention images a subject whose light emission intensity attenuates with passage of time.

In addition, the program disclosed in the description of the present invention causes a computer to execute each of the steps of the aforementioned imaging method.

Incidentally, the aforementioned program can be recorded and provided on a computer-readable non-transitory recording medium. Such a "computer-readable recording medium" includes, for example, an optical medium such as a CD-ROM (Compact Disc-Rom), a magnetic recording medium such as a memory card, etc. In addition, such a program can be also provided by downloading through a network.

The present invention can be used for analysis of a subject emitting light or developing a color.

Although the embodiment of the present invention has been described above in detail, this is merely exemplified. The present invention can be carried out in a mode in which various changes are made without departing from the gist of the present invention. The present application is based on a Japanese patent application (Patent Application No. 2018-79361) which was filed on Apr. 17, 2018, and the contents of which are incorporated herein by reference.

REFERENCE SIGNS LIST 1 imaging system
100 imaging apparatus
120 housing
120a upper face of housing
121 lid
122 subject placement portion
130 imaging portion
131 lens portion
132 imaging device
133 signal processing portion
134 storage portion
135 communication portion
136 imaging control portion
137 cooling device
140 incident light source
150 transmitted light source
200 control apparatus
201 operating portion
202 display portion
203 storage portion
204 communication portion
205 control portion
206 interface portion
210 image generating portion
211 region setting portion
212 SN ratio calculating portion
213 total light exposure time calculating portion
214 saturation light exposure time calculating portion
B band
I subject image
L1 to L4 lane
NROI non-region-of-interest
P photographic image
PS subject
ROI region-of-interest

The invention claimed is:
1. An imaging system comprising:
an imaging unit that images a subject; and
a control unit that enables the imaging unit to perform pre-imaging one or more times, and main imaging one or more times following the pre-imaging; wherein:
the control unit has
an image generating portion that generates a subject image based on one or more taken images in each of the pre-imaging and the main imaging,
an interface portion that displays the subject image and accepts a user input for setting at least a region-of-interest, of the region-of-interest and a non-region-of-interest of the subject image,
a region setting portion that sets the region-of-interest based on the user input, and sets the non-region-of-interest,
an SN ratio calculating portion that calculates an SN ratio which is a ratio of a signal component of a pixel value to a noise component of the pixel value based on the set region-of-interest and the set non-region-of-interest, and
a total light exposure time calculating portion that calculates a total light exposure time in which a maximum SN ratio or a preset reference SN ratio can be obtained, based on the SN ratio calculated for the one or more taken images; and
the control unit enables the imaging unit to perform the main imaging based on the total light exposure time.
2. The imaging system according to claim 1, wherein:
the signal component of the pixel value is a difference between an average or a median of pixel values in the set region-of-interest and an average or a median of pixel values in the set non-region-of-interest.
3. The imaging system according to claim 1, wherein:
the noise component of the pixel value is a standard deviation of pixel values in the set non-region-of-interest.
4. The imaging system according to claim 1, wherein:
the reference SN ratio is set as the product of an SN ratio in the subject image that is used by the region setting portion for setting the region-of-interest and the non-region-of-interest, and a reference SN ratio improvement coefficient that is set in advance.
5. The imaging system according to claim 4, wherein:
the interface portion accepts a user input for setting the reference SN ratio or the reference SN ratio improvement coefficient.
6. The imaging system according to claim 1, wherein:
the interface portion accepts a user input for selecting one of the maximum SN ratio and the reference SN ratio to be used for calculating the total light exposure time.
7. The imaging system according to claim 1, wherein:
the control unit divides the total light exposure time into segments, and enables the imaging unit to perform the main imaging multiple times in which light exposure is performed in accordance with the segments;
the image generating portion obtains an arithmetic average or a weighted average of images taken by the multiple times of the main imaging so as to generate the subject image, and updates the subject image whenever the main imaging is performed; and
the interface portion displays the updated subject image.
8. The imaging system according to claim 7, wherein:
the control unit determines whether a change rate of the SN ratio in the updated subject image is lower than a predetermined value or not, based on a change in the SN ratio, and interrupts imaging when the change rate of the SN ratio is lower than the predetermined value.

9. The imaging system according to claim 8, wherein:
when the imaging has been interrupted, the interface portion displays, of the subject images generated till the interruption of the imaging, the subject image in which the SN ratio is maximum.

10. The imaging system according to claim 7, wherein:
when the interface portion accepts a user input for setting a region-of-interest of the updated subject image,
the region setting portion resets the region-of-interest based on the user input, and resets the non-region-of-interest,
the SN ratio calculating portion recalculates the SN ratio based on the reset region-of-interest and the reset non-region-of-interest, and
the total light exposure time calculating portion recalculates the total light exposure time based on the recalculated SN ratio.

11. The imaging system according to claim 10, wherein:
the control unit has a saturation light exposure time calculating portion that calculates a shortest saturation light exposure time when a pixel whose pixel value has reached a saturation region appears in an image taken by the main imaging, based on one or more taken images; and
a light exposure time in each of the multiple times of the main imaging is shorter than the calculated saturation light exposure time.

12. The imaging system according to claim 7, wherein:
a light exposure time in each of the multiple times of the main imaging is set to be longer as the main imaging is later.

13. The imaging system according to claim 7, wherein:
whenever the subject image is updated, the SN ratio calculating portion calculates the SN ratio, and the total light exposure time calculating portion calculates the total light exposure time.

14. The imaging system according to claim 1, wherein:
the control unit divides the total light exposure time into segments, and enables the imaging unit to perform the main imaging multiple times in which light exposure is performed in accordance with the segments;
the image generating portion adds up images taken by the multiple times of the main imaging so as to generate the subject image, and updates the subject image whenever the main image is performed; and
the interface portion displays the updated subject image.

15. The imaging system according to claim 14, wherein:
when the interface portion accepts a user input for setting a region-of-interest of the updated subject image,
the region setting portion resets the region-of-interest based on the user input, and resets the non-region-of-interest,
the SN ratio calculating portion recalculates the SN ratio based on the reset region-of-interest and the reset non-region-of-interest, and
the total light exposure time calculating portion recalculates the total light exposure time based on the recalculated SN ratio.

16. The imaging system according to claim 1, wherein:
the interface portion displays the calculated SN ratio and the calculated total light exposure time.

17. The imaging system according to claim 16, wherein:
when the interface portion accepts a user input for resetting the reference SN ratio,
the total light exposure time calculating portion recalculates a total light exposure time in which the reset reference SN ratio can be obtained.

18. The imaging system according to claim 16, wherein:
when the interface portion accepts a user input for setting the total light exposure time,
the control unit enables the imaging unit to perform the main imaging based on a shorter total light exposure time of the calculated total light exposure time and the set total light exposure time.

19. The imaging system according to claim 16, wherein:
when the interface portion accepts a user input for interrupting imaging,
the control unit interrupts the imaging.

20. The imaging system according to claim 1, wherein:
when the total of light exposure times in the multiple times of the main imaging exceeds an upper limit total light exposure time that is set in advance,
the control unit interrupts imaging.

21. The imaging system according to claim 20, wherein:
the upper limit total light exposure time differs from one subject kind to another, so that the upper limit total light exposure time corresponding to a subject emitting fluorescence is shorter than the upper limit total light exposure time corresponding to a subject emitting light as a result of a chemical reaction.

22. The imaging system according to claim 20, wherein:
when the light exposure time in each of the multiple times of the main imaging exceeds an upper limit light exposure time that is set in advance,
the control unit interrupts imaging.

23. The imaging system according to claim 22, wherein:
the upper limit light exposure time differs from one subject kind to another, so that the upper limit light exposure time corresponding to a subject emitting fluorescence is shorter than the upper limit light exposure time corresponding to a subject emitting light as a result of a chemical reaction.

24. An imaging system according to claim 1, wherein:
the interface portion accepts a user input for setting a subject kind; and
the control portion has a storage portion that stores imaging conditions for each subject kind, so that the control unit enables the imaging unit to perform the pre-imaging based on the imaging conditions corresponding to the set subject kind.

25. The imaging system according to claim 1, wherein:
the imaging system images a subject emitting light.

26. An imaging system comprising:
an imaging unit that images a subject; and
a control unit that enables the imaging unit to perform pre-imaging one or more times, and main imaging one or more times following the pre-imaging; wherein:
the control unit has
an image generating portion that generates a subject image based on one or more taken images in each of the pre-imaging and the main imaging,
an interface portion that displays the subject image,
a region setting portion that sets a region-of-interest and a non-region-of-interest of the subject image,
an SN ratio calculating portion that calculates an SN ratio which is a ratio of a signal component of a pixel value to a noise component of the pixel value, based on the set region-of-interest and the set non-region-of-interest, and
a total light exposure time calculating portion that calculates a total light exposure time in which a maximum SN ratio or a preset reference SN ratio can be obtained, based on the SN ratio calculated for the one or more taken images; and the control unit enables the imaging unit to perform the main imaging based on the total light exposure time.

27. The imaging system according to claim 26, wherein: the imaging system images a subject whose light emission intensity attenuates with passage of time.

28. An imaging method comprising:
performing pre-imaging one or more times by use of an imaging unit imaging a subject;
generating a subject image based on one or more images taken by the pre-imaging;
displaying the generated subject image, setting a region-of-interest of the subject image based on a user input, and setting a non-region-of-interest of the subject image;
calculating an SN ratio which is a ratio of a signal component of a pixel value to a noise component of the pixel value based on the set region-of-interest and the set non-region-of-interest;
calculating a total light exposure time in which a maximum SN ratio or a preset reference SN ration can be obtained, based on the SN ratio calculated for the one or more taken images;
performing main imaging one or more times based on the total light exposure time by use of the imaging unit; and
generating a subject image based on one or more images taken by the main imaging.

29. The imaging method according to claim 28, wherein: the imaging method images a subject emitting light.

30. An imaging method comprising:
performing pre-imaging one or more times by use of an imaging unit imaging a subject;
generating a subject image based on one or more images taken by the pre-imaging;
displaying the subject image and setting a region-of-interest and a non-region-of-interest of the subject image;
calculating an SN ratio which is a ratio of a signal component of a pixel value to a noise component of the pixel value based on the set region-of-interest and the set non-region-of-interest;
calculating a total light exposure time in which a maximum SN ratio or a preset reference SN ration can be obtained, based on the SN ratio calculated for the one or more taken images;
performing main imaging one or more times based on the total light exposure time by use of the imaging unit; and
generating a subject image based on one or more images taken by the main imaging.

31. The imaging method according to claim 30, wherein: the imaging method images a subject whose light emission intensity attenuates with passage of time.

32. A non-transitory computer readable medium storing a program causing a computer to execute an imaging method comprising:
performing pre-imaging one or more times by use of an imaging unit imaging a subject;
generating a subject image based on one or more images taken by the pre-imaging;
displaying the generated subject image, setting a region-of-interest of the subject image based on a user input, and setting a non-region-of-interest of the subject image;
calculating an SN ratio which is a ratio of a signal component of a pixel value to a noise component of the pixel value based on the set region-of-interest and the set non-region-of-interest;
calculating a total light exposure time in which a maximum SN ratio or a preset reference SN ration can be obtained, based on the SN ratio calculated for the one or more taken images;
performing main imaging one or more times based on the total light exposure time by use of the imaging unit; and
generating a subject image based on one or more images taken by the main imaging.

* * * * *